US012707358B2

(12) United States Patent
Lee et al.

(10) Patent No.: US 12,707,358 B2
(45) Date of Patent: Aug. 11, 2026

(54) APPARATUS AND METHOD FOR PERFORMING CALL SERVICE FALLBACK IN WIRELESS COMMUNICATION SYSTEM

(71) Applicant: LG ELECTRONICS INC., Seoul (KR)

(72) Inventors: Myung Hee Lee, Seoul (KR); Ji Hwan Jang, Seoul (KR); Jaeky Oh, Seoul (KR); Jae Yong Park, Seoul (KR); Yecheng He, Seoul (KR); Sungjin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 335 days.

(21) Appl. No.: 18/572,627

(22) PCT Filed: Jul. 27, 2021

(86) PCT No.: PCT/KR2021/009720
§ 371 (c)(1),
(2) Date: Dec. 20, 2023

(87) PCT Pub. No.: WO2023/008596
PCT Pub. Date: Feb. 2, 2023

(65) Prior Publication Data

US 2024/0284285 A1 Aug. 22, 2024

(51) Int. Cl.
*H04W 36/08* (2009.01)
*H04W 36/14* (2009.01)
(Continued)

(52) U.S. Cl.
CPC ......... *H04W 36/08* (2013.01); *H04W 36/144* (2023.05); *H04W 36/30* (2013.01); *H04W 36/302* (2023.05); *H04W 68/02* (2013.01)

(58) Field of Classification Search
CPC . H04W 36/08; H04W 36/144; H04W 36/302; H04W 36/30; H04W 68/02
See application file for complete search history.

(56) References Cited

U.S. PATENT DOCUMENTS 9,843,967 B1 12/2017 Oroskar et al.
10,868,713 B1 12/2020 Mangrulkar et al.
(Continued)

FOREIGN PATENT DOCUMENTS

KR 10-2011-0090035 8/2011

OTHER PUBLICATIONS

PCT International Application No. PCT/KR2021/009720, International Search Report dated Apr. 18, 2022, 4 pages.

*Primary Examiner* — Mewale A Ambaye
(74) *Attorney, Agent, or Firm* — LEE, HONG, DEGERMAN, KANG & WAIMEY

(57) ABSTRACT

A method of operating a terminal in a wireless communication system may include receiving a paging message including information indicating a range of a threshold for determining whether to perform fallback for a call service from a first base station belonging to a first network, transmitting a request message requesting the fallback for the call service to the base station based on channel quality of the first base station being less than the threshold determined based on the information and transmitting a paging response message to a second base station belonging to a second network.

14 Claims, 27 Drawing Sheets

(51) Int. Cl.
*H04W 36/30* (2009.01)
*H04W 68/02* (2009.01)

(56) References Cited

U.S. PATENT DOCUMENTS

| | | | | |
|---|---|---|---|---|
| 10,869,244 | B2 * | 12/2020 | Kim | H04W 36/14 |
| 2009/0259624 | A1 * | 10/2009 | DeMaris | G06F 16/24534 |
| 2017/0086102 | A1 * | 3/2017 | Tsai | H04W 36/00226 |
| 2019/0191349 | A1 | 6/2019 | Kim et al. | |
| 2020/0112872 | A1 * | 4/2020 | Nimbavikar | H04W 28/0268 |
| 2021/0011864 | A1 * | 1/2021 | Guim Bernat | G06F 12/0238 |
| 2021/0136645 | A1 * | 5/2021 | Zhao | H04W 36/30 |
| 2025/0080396 | A1 * | 3/2025 | Titon | H04L 41/0631 |
| 2025/0094400 | A1 * | 3/2025 | Mishra | G06F 16/2246 |
| 2025/0096965 | A1 * | 3/2025 | Dai | H04L 5/0037 |

* cited by examiner

APPARATUS AND METHOD FOR PERFORMING CALL SERVICE FALLBACK IN WIRELESS COMMUNICATION SYSTEM

CROSS-REFERENCE TO RELATED APPLICATION(S)

This application is the National Stage filing under 35 U.S.C. 371 of International Application No. PCT/KR2021/009720, filed on Jul. 27, 2021, the contents of which is hereby incorporated by reference herein in its entirety.

TECHNICAL FIELD

The following description relates to a wireless communication system and, more particularly, to an apparatus and method for performing fallback of a call service in a wireless communication system.

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure can provide an apparatus and method for maintaining continuity of a call service in a wireless communication system.

The present disclosure can provide an apparatus and method for fallback of a call service in a wireless communication system.

The present disclosure can provide an apparatus and method for determining whether to perform fallback of a call service based on channel quality in a wireless communication system.

The present disclosure can provide an apparatus and method for determining a channel quality criterion for determining whether to perform fallback of a call service in a wireless communication system.

The technical objects to be achieved in the present disclosure are not limited to the above-mentioned technical objects, and other technical objects that are not mentioned may be considered by those skilled in the art through the embodiments described below.

As an example of the present disclosure, a method of operating a terminal in a wireless communication system may comprise receiving a paging message including information indicating a range of a threshold for determining whether to perform fallback for a call service from a first base station belonging to a first network, transmitting a request message requesting the fallback for the call service to the base station based on channel quality of the first base station being less than the threshold determined based on the information, and transmitting a paging response message to a second base station belonging to a second network.

As an example of the present disclosure, method of operating a base station in a wireless communication system may comprise receiving a message indicating that a terminated call has occurred from an upper node to a terminal, transmitting, to the terminal, a paging message including information indicating a range of a threshold for determining whether to perform fallback of a call service, and receiving, from the terminal, a request message requesting the fallback or a paging response message corresponding to the paging message.

As an example of the present disclosure, a terminal in a wireless communication system may comprise a transceiver and a processor connected to the transceiver. The processor may receive a paging message including information indicating a range of a threshold for determining whether to perform fallback for a call service from a first base station belonging to a first network, transmit a request message requesting the fallback for the call service to the base station based on channel quality of the first base station being less than the threshold determined based on the information; and transmit a paging response message to a second base station belonging to a second network.

As an example of the present disclosure, a base station in a wireless communication system may comprise a transceiver and a processor connected to the transceiver. The processor may receive a message indicating that a terminated call has occurred from an upper node to a terminal, transmit, to the terminal, a paging message including information indicating a range of a threshold for determining whether to perform fallback of a call service, and receive, from the terminal, a request message requesting the fallback or a paging response message corresponding to the paging message.

As an example of the present disclosure, a communication apparatus may comprise at least one processor and at least one computer memory connected to the at least one processor and configured to store instructions instructing operations as executed by the at least one processor. The operations may comprise receiving a paging message including information indicating a range of a threshold for determining whether to perform fallback for a call service from a first base station belonging to a first network, transmitting a request message requesting the fallback for the call service to the base station based on channel quality of the first base station being less than the threshold determined based on the information, and transmitting a paging response message to a second base station belonging to a second network As an example of the present disclosure, a non-transitory computer-readable medium storing at least one instruction may comprise the at least one instruction executable by a processor. The at least one instruction may control an apparatus to receive a paging message including information indicating a range of a threshold for determining whether to perform fallback for a call service from a first base station belonging to a first network, transmit a request message requesting the fallback for the call service to the base station based on channel quality of the first base station being less than the threshold determined based on the information and transmit a paging response message to a second base station belonging to a second network The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

As is apparent from the above description, the embodiments of the present disclosure have the following effects.

According to the present disclosure, continuity of a voice service can be secured during a transition period when a new system is introduced.

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

DETAILED DESCRIPTION

Figure 1:
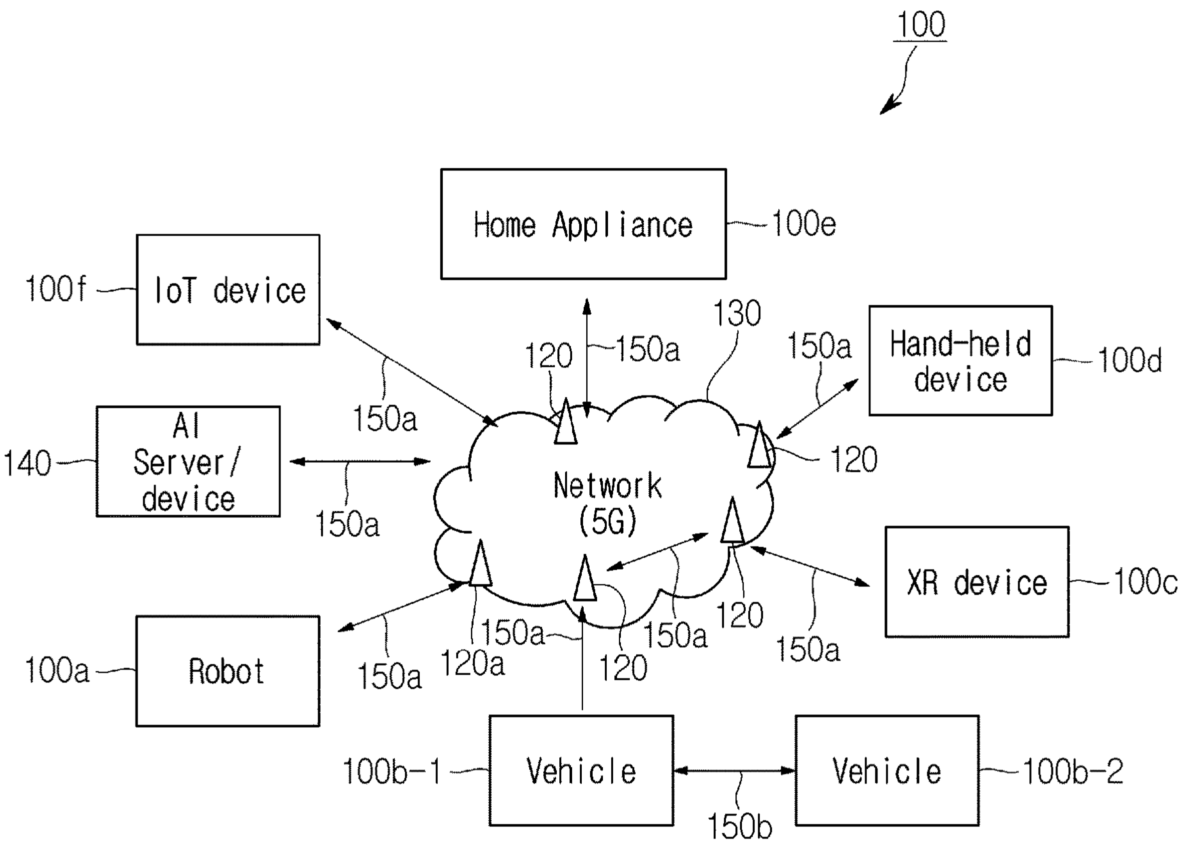
FIG. 1 illustrates an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a call service and a receiver is a fixed and/or mobile node that receives a data service or a call service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.XXX.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100*a*, vehicles 100*b*-1 and 100*b*-2, an extended reality (XR) device 100*c*, a hand-held device 100*d*, a home appliance 100*e*, an Internet of Thing (IoT) device 100*f*, and an artificial intelligence (AI) device/server 100*g*. For example, the vehicles may include a vehicle having a wireless communication function, an autonomous vehicle, a vehicle capable of performing vehicle-to-vehicle communication, etc. The vehicles 100*b*-1 and 100*b*-2 may include an unmanned aerial vehicle (UAV) (e.g., a drone). The XR device 100*c* includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100*d* may include a smartphone, a smart pad, a wearable device (e.g., a smart watch or smart glasses), a computer (e.g., a laptop), etc. The home appliance 100*e* may include a TV, a refrigerator, a washing machine, etc. The IoT device 100*f* may include a sensor, a smart meter, etc. For example, the base station 120 and the network 130 may be implemented by a wireless device, and a specific wireless device 120*a* may operate as a base station/network node for another wireless device.

The wireless devices 100*a* to 100*f* may be connected to the network 130 through the base station 120. AI technology is applicable to the wireless devices 100*a* to 100*f*, and the wireless devices 100*a* to 100*f* may be connected to the AI server 100*g* through the network 130. The network 130 may be configured using a 3G network, a 4G (e.g., LTE) network or a 5G (e.g., NR) network, etc. The wireless devices 100*a* to 100*f* may communicate with each other through the base station 120/the network 130 or perform direct communication (e.g., sidelink communication) without through the base station 120/the network 130. For example, the vehicles 100*b*-1 and 100*b*-2 may perform direct communication (e.g., vehicle to vehicle (V2V)/vehicle to everything (V2X) communication). In addition, the IoT device 100*f* (e.g., a sensor) may perform direct communication with another IoT device (e.g., a sensor) or the other wireless devices 100*a* to 100*f*.

Wireless communications/connections 150*a*, 150*b* and 150*c* may be established between the wireless devices 100*a* to 100*f*/the base station 120 and the base station 120/the base station 120. Here, wireless communication/connection may be established through various radio access technologies (e.g., 5G NR) such as uplink/downlink communication 150*a*, sidelink communication 150*b* (or D2D communication) or communication 150*c* between base stations (e.g., relay, integrated access backhaul (IAB). The wireless device and the base station/wireless device or the base station and the base station may transmit/receive radio signals to/from each other through wireless communication/connection 150*a*, 150*b* and 150*c*. For example, wireless communication/connection 150*a*, 150*b* and 150*c* may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
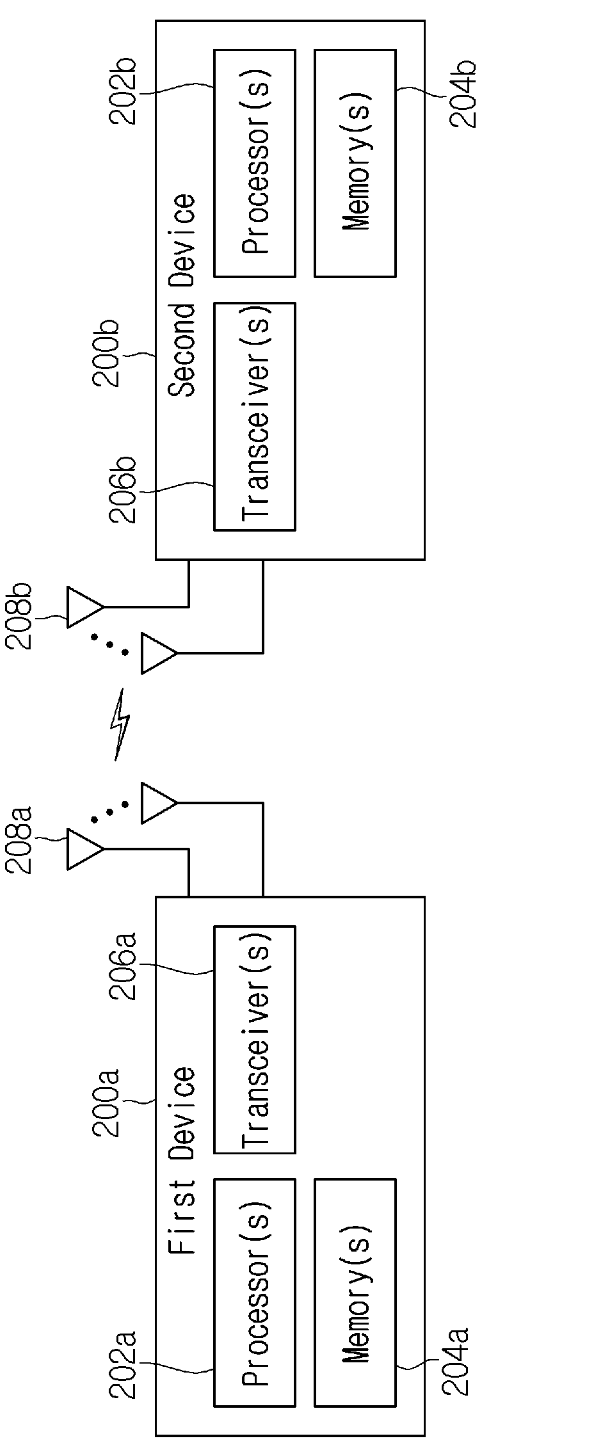
FIG. 2 illustrates an example of a wireless apparatus applicable to the present disclosure.

FIG. 2 is a view showing an example of a wireless device applicable to the present disclosure.

Referring to FIG. 2, a first wireless device 200*a* and a second wireless device 200*b* may transmit and receive radio signals through various radio access technologies (e.g., LTE or NR). Here, (the first wireless device 200*a*, the second wireless device 200*b*) may correspond to (the wireless device 100*x*, the base station 120) and/or (the wireless device 100*x*, the wireless device 100*x*) of FIG. 1.

The first wireless device 200*a* may include one or more processors 202*a* and one or more memories 204*a* and may further include one or more transceivers 206*a* and/or one or more antennas 208*a*. The processor 202*a* may be configured to control the memory 204*a* and/or the transceiver 206*a* and to implement descriptions, functions, procedures, proposals, methods and/or operational flowcharts disclosed herein. For example, the processor 202*a* may process information in the memory 204*a* to generate first information/signal and then transmit a radio signal including the first information/signal through the transceiver 206*a*. In addition, the processor 202*a* may receive a radio signal including second information/signal through the transceiver 206*a* and then store information obtained from signal processing of the second information/signal in the memory 204*a*. The memory 204*a* may be coupled with the processor 202*a*, and store a variety of information related to operation of the processor 202*a*. For example, the memory 204*a* may store software code including instructions for performing all or some of the processes controlled by the processor 202*a* or performing the descriptions, functions, procedures, proposals, methods and/or operational flowcharts disclosed herein. Here, the processor 202*a* and the memory 204*a* may be part of a communication modem/circuit/chip designed to implement wireless communication technology (e.g., LTE or NR). The transceiver 206*a* may be coupled with the processor 202*a* to transmit and/or receive radio signals through one or more antennas 208*a*. The transceiver 206*a* may include a transmitter and/or a receiver. The transceiver 206*a* may be used interchangeably with a radio frequency (RF) unit. In the present disclosure, the wireless device may refer to a communication modem/circuit/chip.

The second wireless device 200*b* may include one or more processors 202*b* and one or more memories 204*b* and may further include one or more transceivers 206*b* and/or one or more antennas 208*b*. The processor 202*b* may be configured to control the memory 204*b* and/or the transceiver 206*b* and to implement the descriptions, functions, procedures, proposals, methods and/or operational flowcharts disclosed herein. For example, the processor 202*b* may process information in the memory 204*b* to generate third information/signal and then transmit the third information/signal through the transceiver 206*b*. In addition, the processor 202*b* may receive a radio signal including fourth information/signal through the transceiver 206*b* and then store information obtained from signal processing of the fourth information/signal in the memory 204*b*. The memory 204*b* may be coupled with the processor 202*b* to store a variety of information related to operation of the processor 202*b*. For example, the memory 204*b* may store software code including instructions for performing all or some of the processes controlled by the processor 202*b* or performing the descriptions, functions, procedures, proposals, methods and/or operational flowcharts disclosed herein. Herein, the processor 202*b* and the memory 204*b* may be part of a communication modem/circuit/chip designed to implement wireless communication technology (e.g., LTE or NR). The transceiver 206*b* may be coupled with the processor 202*b* to transmit and/or receive radio signals through one or more antennas 208*b*. The transceiver 206*b* may include a transmitter and/or a receiver. The transceiver 206*b* may be used interchangeably with a radio frequency (RF) unit. In the present disclosure, the wireless device may refer to a communication modem/circuit/chip.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202*a* and 202*b* may generate one or more protocol data units (PDUs) and/or one or more service data unit (SDU) according to the descriptions, functions, procedures, proposals, methods and/or operational flowcharts disclosed herein. One or more processors 202*a* and 202*b* may generate messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be coupled with one or more processors 202*a* and 202*b* to store various types of data, signals, messages, information, programs, code, instructions and/or commands. One or more memories 204*a* and 204*b* may be composed of read only memories (ROMs), random access memories (RAMs), erasable programmable read only memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be coupled with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. For example, one or more transceivers 206*a* and 206*b* may be coupled with one or more processors 202*a* and 202*b* to transmit/receive radio signals. For example, one or more processors 202*a* and 202*b* may perform control such that one or more transceivers 206*a* and 206*b* transmit user data, control information or radio signals to one or more other apparatuses. In addition, one or more processors 202*a* and 202*b* may perform control such that one or more transceivers 206*a* and 206*b* receive user data, control information or radio signals from one or more other apparatuses. In addition, one or more transceivers 206*a* and 206*b* may be coupled with one or more antennas 208*a* and 208*b*, and one or more transceivers 206*a* and 206*b* may be configured to transmit/receive user data, control information, radio signals/channels, etc. described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc. from RF band signals to baseband signals, in order to process the received user data, control information, radio signals/channels, etc. using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

Structure of Wireless Device Applicable to the Present Disclosure

Figure 3:
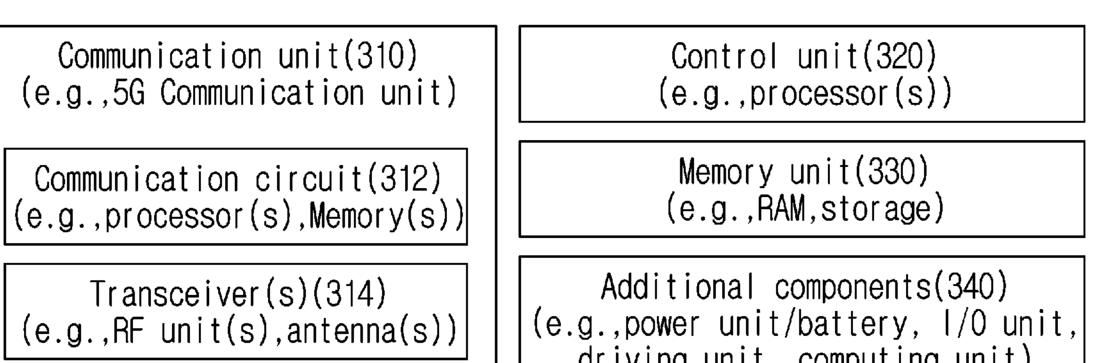
FIG. 3 illustrates another example of a wireless device applicable to the present disclosure.

FIG. 3 is a view showing another example of a wireless device applicable to the present disclosure.

Referring to FIG. 3, a wireless device 300 may correspond to the wireless devices 200*a* and 200*b* of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202*a* and 202*b* and/or one or more memories 204*a* and 204*b* of FIG. 2. For example, the transceiver(s) 314 may include one or more transceivers 206*a* and 206*b* and/or one or more antennas 208*a* and 208*b* of FIG. 2. The control unit 320 may be electrically coupled with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100*a*), the vehicles (FIG. 1, 100*b*-1 and 100*b*-2), the XR device (FIG. 1, 100*c*), the hand-held device (FIG. 1, 100*d*), the home appliance (FIG. 1, 100*e*), the IoT device (FIG. 1, 100*f*), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be coupled with each other through wired interfaces or at least some thereof may be wirelessly coupled through the communication unit 310. For example, in the wireless device 300, the control unit 320 and the communication unit 310 may be coupled by wire, and the control unit 320 and the first unit (e.g., 130 or 140) may be wirelessly coupled through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 4:
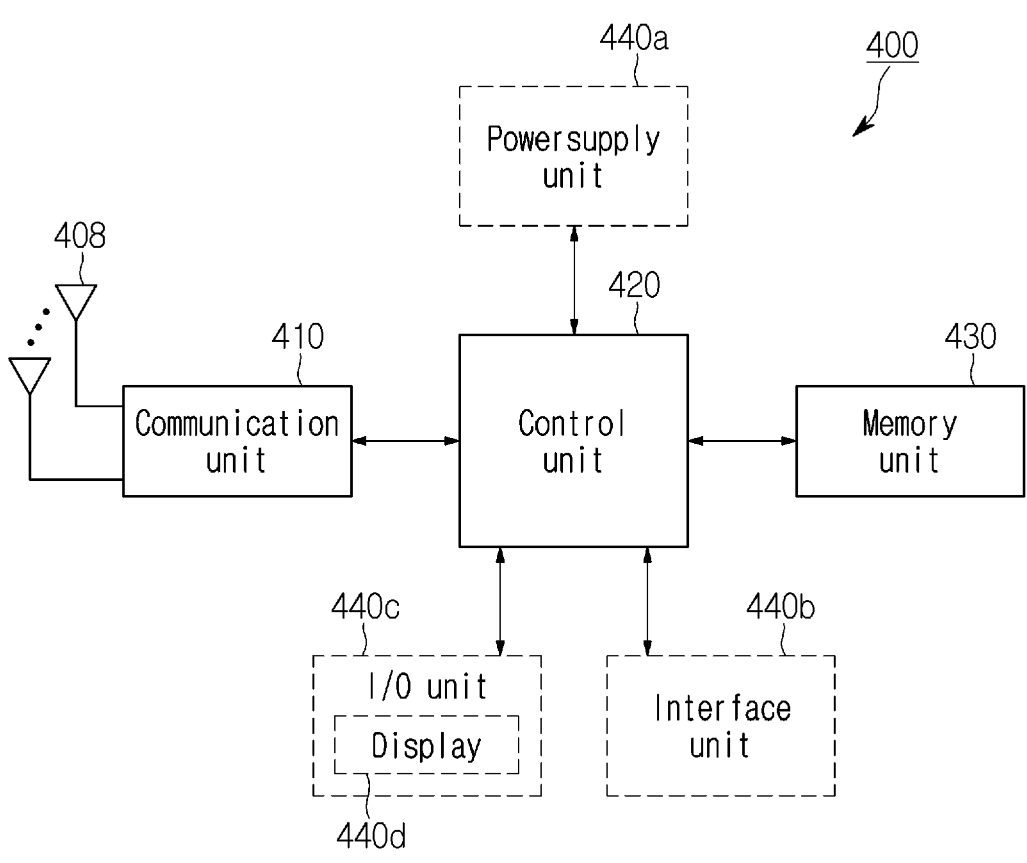
FIG. 4 illustrates an example of a hand-held device applicable to the present disclosure.

FIG. 4 is a view showing an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440*a*, an interface unit (interface) 440*b*, and an input/output unit 440*c*. An antenna unit (antenna) 408 may be part of the communication unit 410. The blocks 410 to 430/440*a* to 440*c* may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440*a* may supply power to the hand-held device 400 and include a wired/wireless charging circuit, a battery, etc. The interface unit 440*b* may support connection between the hand-held device 400 and another external device. The interface unit 440*b* may include various ports (e.g., an audio input/output port and a video input/output port) for connection with the external device. The input/output unit 440*c* may receive or output video information/signals, audio information/signals, data and/or user input information. The input/output unit 440*c* may include a camera, a microphone, a user input unit, a display 440*d*, a speaker and/or a haptic module.

For example, in case of data communication, the input/output unit 440*c* may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440*c* in various forms (e.g., text, voice, image, video and haptic).

Type of Wireless Device Applicable to the Present Disclosure

Figure 5:
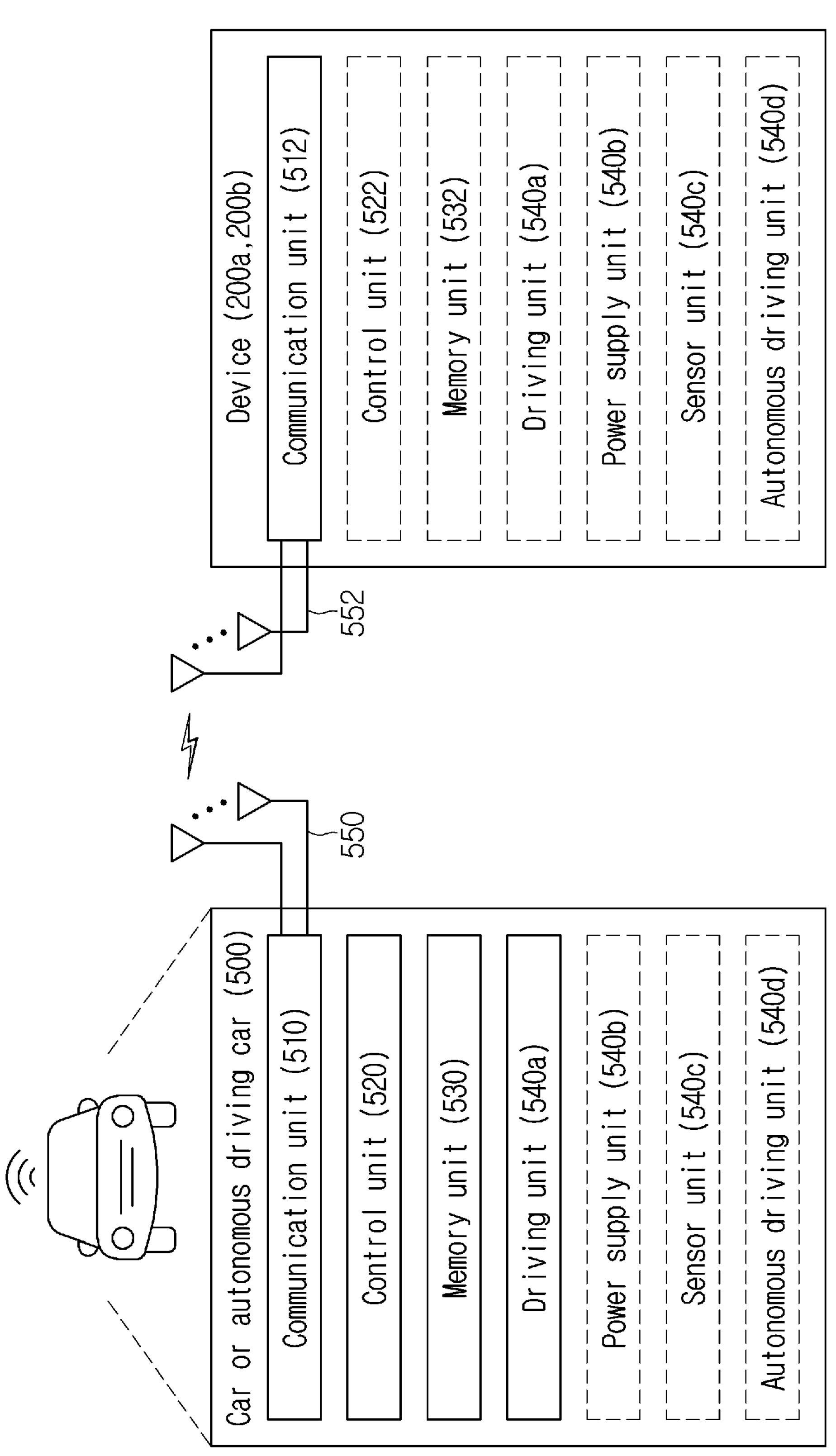
FIG. 5 illustrates an example of a car or an autonomous driving car applicable to the present disclosure.

FIG. 5 is a view showing an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540*a*, a power supply unit (power supply) 540*b*, a sensor unit 540*c*, and an autonomous driving unit 540*d*. The antenna unit 550 may be configured as part of the communication unit 510. The blocks 510/530/540*a* to 540*d* correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU).

Figure 6:
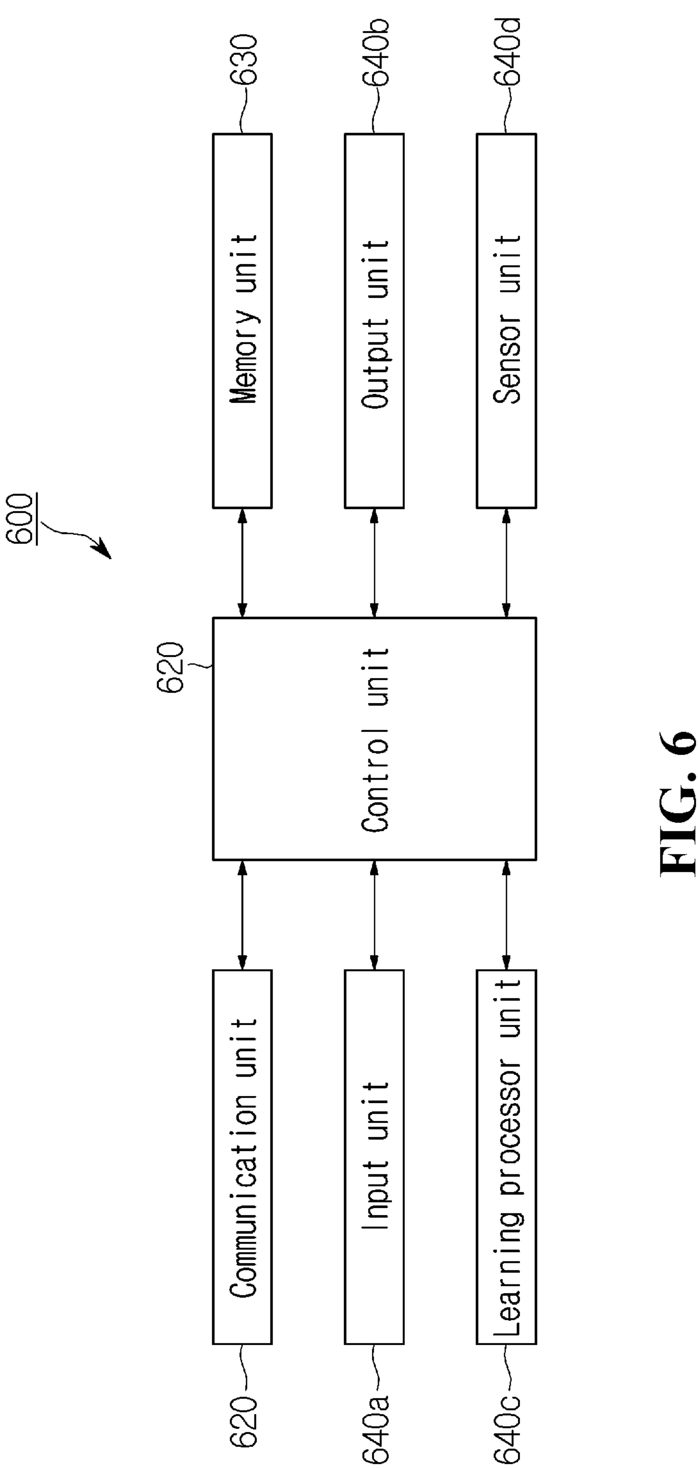
FIG. 6 illustrates an example of artificial intelligence (AI) device applicable to the present disclosure.

FIG. 6 is a view showing an example of artificial intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a set-top box (STB), a radio, a washing machine, a refrigerator, a digital signage, a robot, a vehicle, or the like.

Referring to FIG. 6, the AI device 600 may include a communication unit (transceiver) 610, a control unit (controller) 620, a memory unit (memory) 630, an input/output unit 640*a*/640*b*, a leaning processor unit (learning processor) 640*c* and a sensor unit 640*d*. The blocks 610 to

630/640*a* to 640*d* may correspond to the blocks 310 to 330/340 of FIG. 3, respectively.

The communication unit 610 may transmit and receive wired/wireless signals (e.g., sensor information, user input, learning models, control signals, etc.) to and from external devices such as another AI device (e.g., FIG. 1, 100*x*, 120 or 140) or the AI server (FIG. 1, 140) using wired/wireless communication technology. To this end, the communication unit 610 may transmit information in the memory unit 630 to an external device or transfer a signal received from the external device to the memory unit 630.

The control unit 620 may determine at least one executable operation of the AI device 600 based on information determined or generated using a data analysis algorithm or a machine learning algorithm. In addition, the control unit 620 may control the components of the AI device 600 to perform the determined operation. For example, the control unit 620 may request, search for, receive or utilize the data of the learning processor unit 640*c* or the memory unit 630, and control the components of the AI device 600 to perform predicted operation or operation, which is determined to be desirable, of at least one executable operation. In addition, the control unit 620 may collect history information including operation of the AI device 600 or user's feedback on the operation and store the history information in the memory unit 630 or the learning processor unit 640*c* or transmit the history information to the AI server (FIG. 1, 140). The collected history information may be used to update a learning model.

The memory unit 630 may store data supporting various functions of the AI device 600. For example, the memory unit 630 may store data obtained from the input unit 640*a*, data obtained from the communication unit 610, output data of the learning processor unit 640*c*, and data obtained from the sensing unit 640. In addition, the memory unit 630 may store control information and/or software code necessary to operate/execute the control unit 620.

The input unit 640*a* may acquire various types of data from the outside of the AI device 600. For example, the input unit 640*a* may acquire learning data for model learning, input data, to which the learning model will be applied, etc. The input unit 640*a* may include a camera, a microphone and/or a user input unit. The output unit 640*b* may generate video, audio or tactile output. The output unit 640*b* may include a display, a speaker and/or a haptic module. The sensing unit 640 may obtain at least one of internal information of the AI device 600, the surrounding environment information of the AI device 600 and user information using various sensors. The sensing unit 640 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 640*c* may train a model composed of an artificial neural network using training data. The learning processor unit 640*c* may perform AI processing along with the learning processor unit of the AI server (FIG. 1, 140). The learning processor unit 640*c* may process information received from an external device through the communication unit 610 and/or information stored in the memory unit 630. In addition, the output value of the learning processor unit 640*c* may be transmitted to the external device through the communication unit 610 and/or stored in the memory unit 630.

Figure 7:
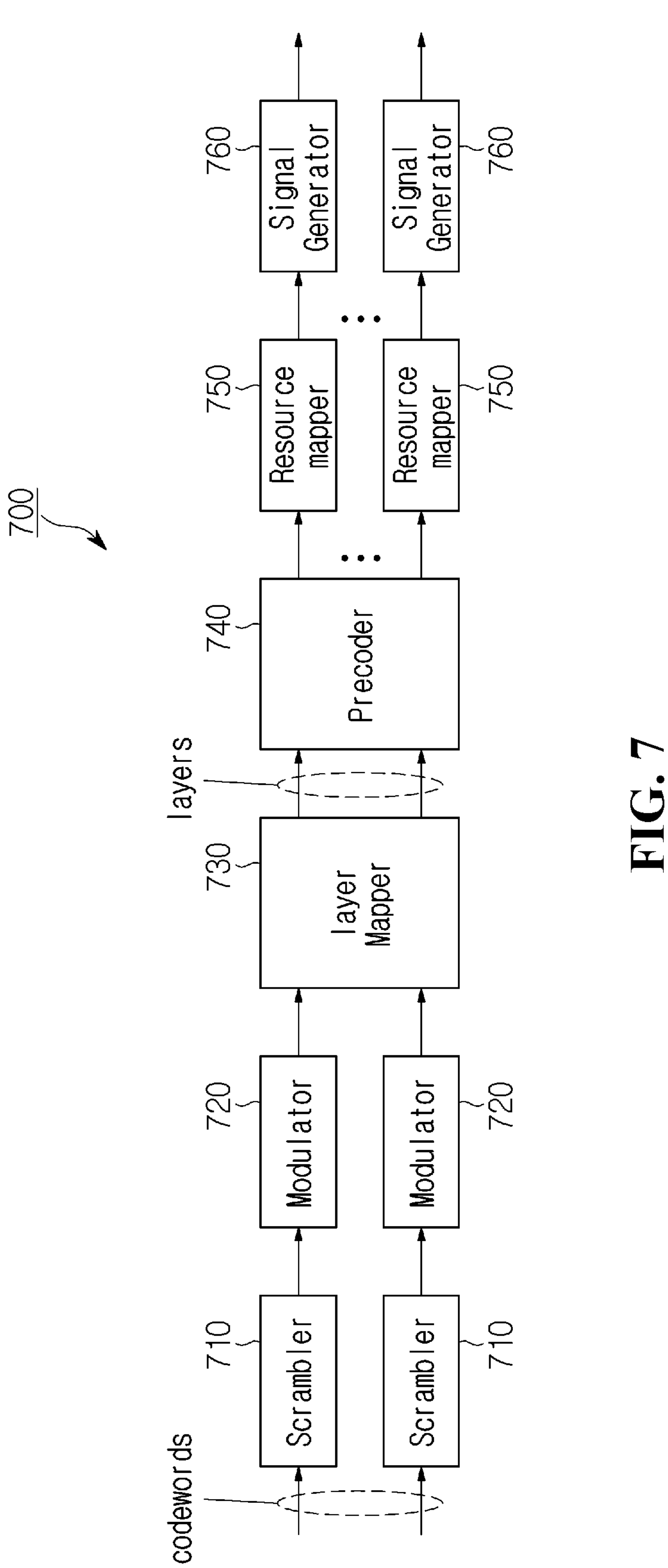
FIG. 7 illustrates a method of processing a transmitted signal applicable to the present disclosure.
Figure 8:
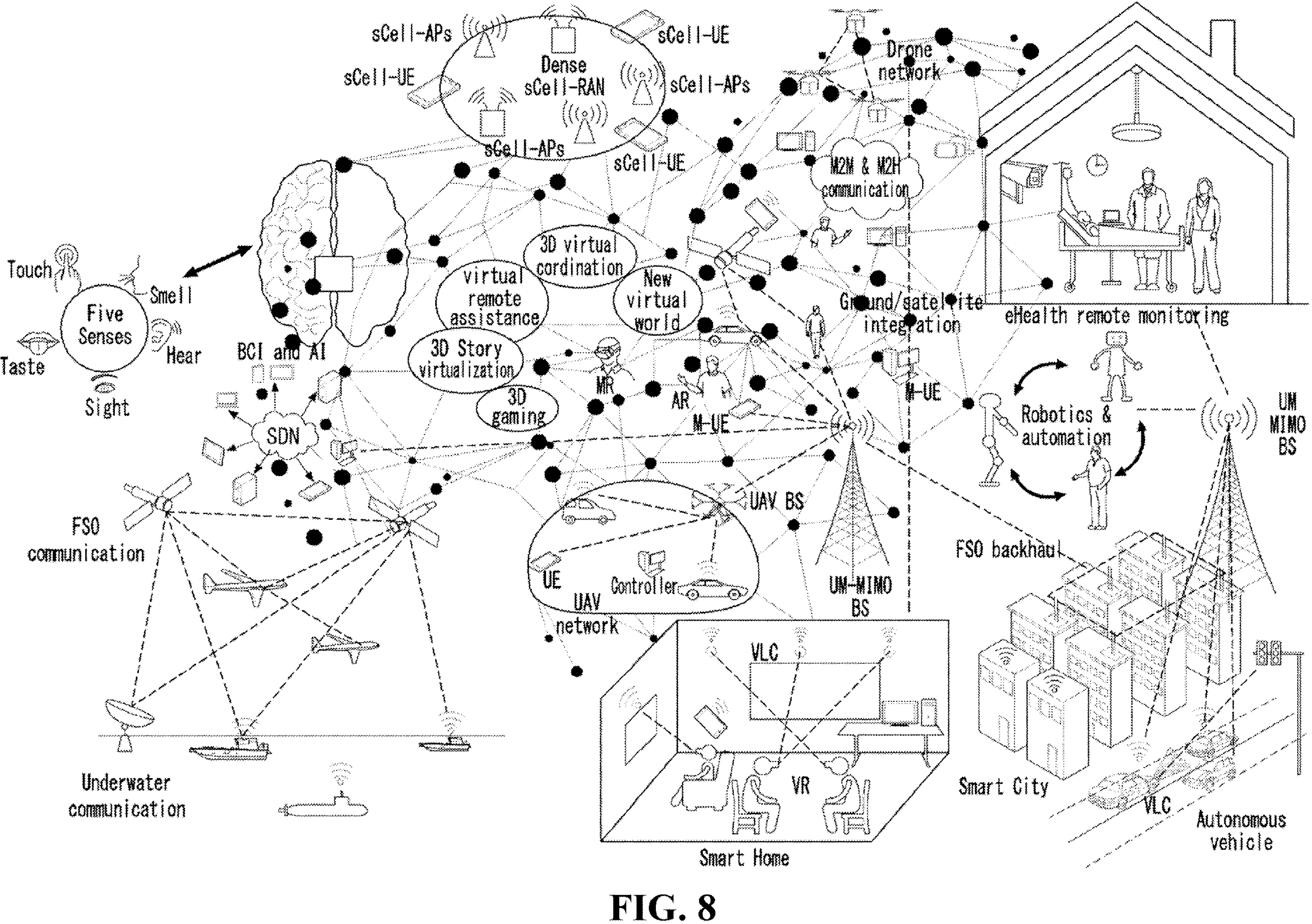
FIG. 8 illustrates an example of a communication structure providable in a 6th generation (6G) system applicable to the present disclosure.

FIG. 7 is a view showing a method of processing a transmitted signal applicable to the present disclosure. For example, the transmitted signal may be processed by a signal processing circuit. At this time, a signal processing circuit 700 may include a scrambler 710, a modulator 720, a layer mapper 730, a precoder 740, a resource mapper 750, and a signal generator 760. At this time, for example, the operation/function of FIG. 7 may be performed by the processors 202*a* and 202*b* and/or the transceiver 206*a* and 206*b* of FIG. 2. In addition, for example, the hardware element of FIG. 7 may be implemented in the processors 202*a* and 202*b* of FIG. 2 and/or the transceivers 206*a* and 206*b* of FIG. 2. For example, blocks 1010 to 1060 may be implemented in the processors 202*a* and 202*b* of FIG. 2. In addition, blocks 710 to 750 may be implemented in the processors 202*a* and 202*b* of FIG. 2 and a block 760 may be implemented in the transceivers 206*a* and 206*b* of FIG. 2, without being limited to the above-described embodiments.

A codeword may be converted into a radio signal through the signal processing circuit 700 of FIG. 7. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 10. Specifically, the codeword may be converted into a bit sequence scrambled by the scrambler 710. The scramble sequence used for scramble is generated based in an initial value and the initial value may include ID information of a wireless device, etc. The scrambled bit sequence may be modulated into a modulated symbol sequence by the modulator 720. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 730. Modulation symbols of each transport layer may be mapped to corresponding antenna port(s) by the precoder 740 (precoding). The output z of the precoder 740 may be obtained by multiplying the output y of the layer mapper 730 by an N*M precoding matrix W. Here, N may be the number of antenna ports and M may be the number of transport layers. Here, the precoder 740 may perform precoding after transform precoding (e.g., discrete Fourier transform (DFT)) for complex modulation symbols. In addition, the precoder 740 may perform precoding without performing transform precoding.

The resource mapper 750 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 760 may generate a radio signal from the mapped modulation symbols, and the generated radio signal may be transmitted to another device through each antenna. To this end, the signal generator 760 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 710 to 760 of FIG. 7. For example, the wireless device (e.g., 200*a* or 200*b* of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 1 below. That is, Table 1 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 10:
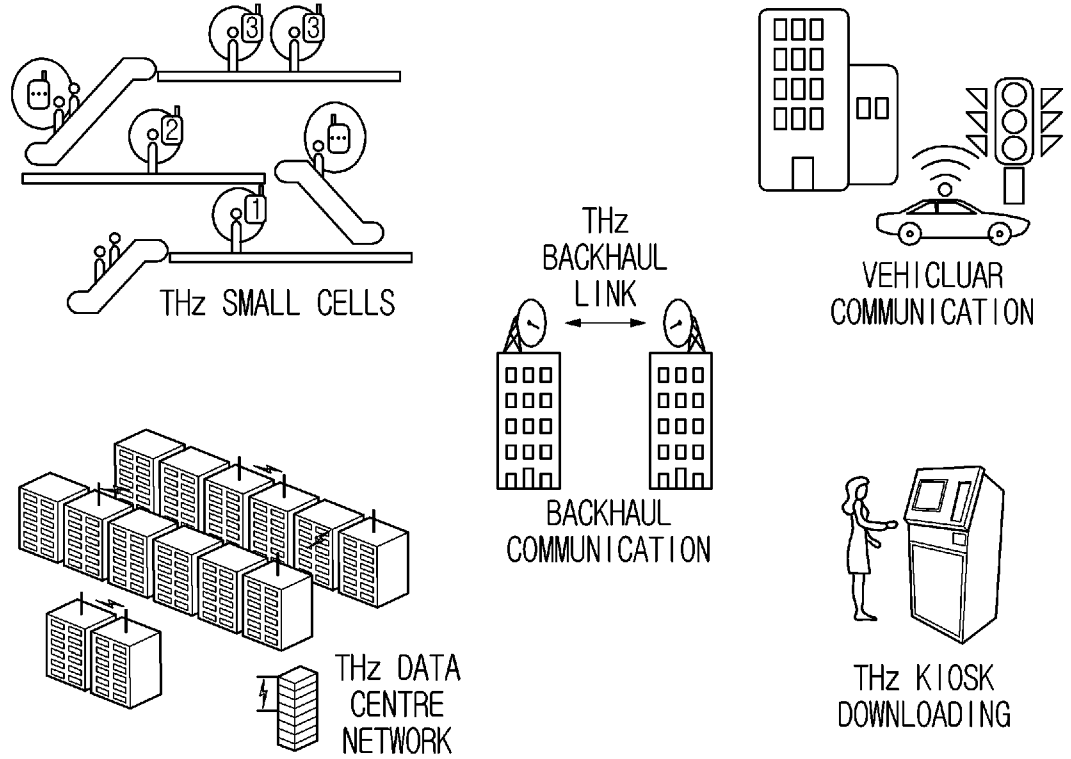
FIG. 10 illustrates a THz communication method applicable to the present disclosure.

FIG. 10 is a view showing an example of a communication structure providable in a 6G system applicable to the present disclosure.

Referring to FIG. 10, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to build a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

Terahertz (THz) Communication

THz communication is applicable to the 6G system. For example, a data rate may increase by increasing bandwidth. This may be performed by using sub-THz communication with wide bandwidth and applying advanced massive MIMO technology.

Figure 9:
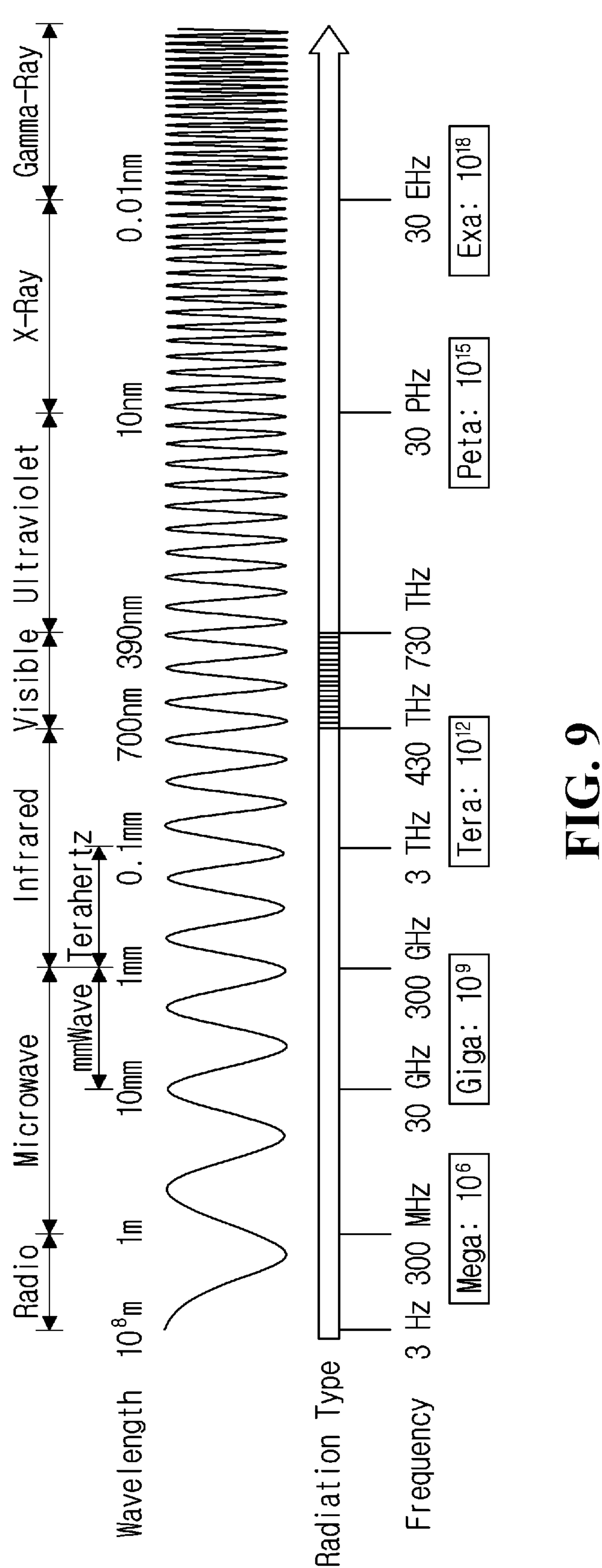
FIG. 9 illustrates an electromagnetic spectrum applicable to the present disclosure.

FIG. 9 is a view showing an electromagnetic spectrum applicable to the present disclosure. For example, referring to FIG. 9, THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated by the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

THz Wireless Communication

FIG. 10 is a view showing a THz communication method applicable to the present disclosure.

Referring to FIG. 10, THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

Artificial Intelligence System

Figure 11:
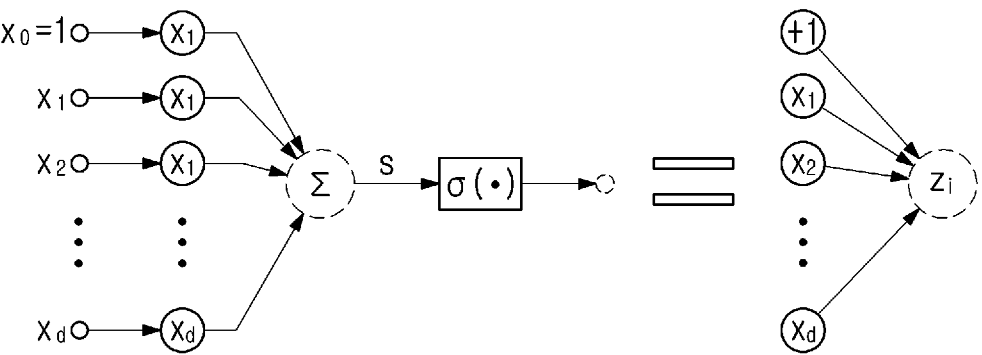
FIG. 11 illustrates a perceptron architecture in an artificial neural network applicable to the present disclosure.
Figure 12:
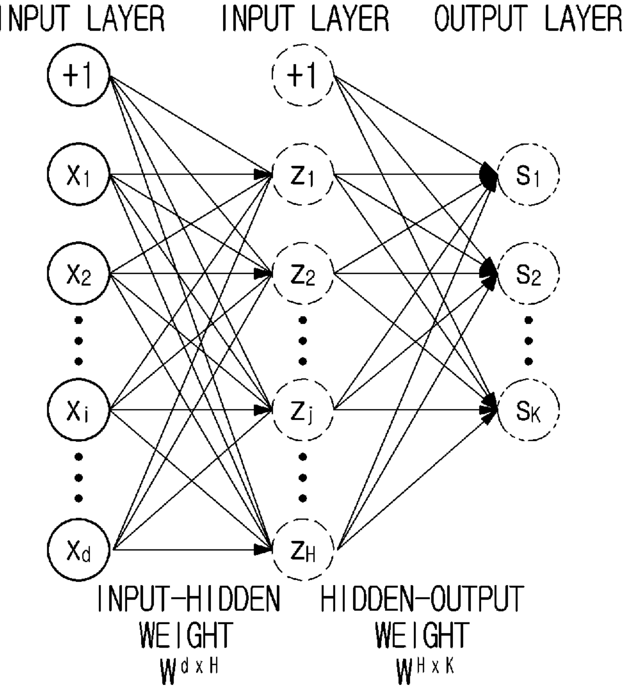
FIG. 12 illustrates an artificial neural network architecture applicable to the present disclosure.

FIG. 11 is a view showing a perceptron architecture in an artificial neural network applicable to the present disclosure. In addition, FIG. 12 is a view showing an artificial neural network architecture applicable to the present disclosure.

As described above, an artificial intelligence system may be applied to a 6G system. Herein, as an example, the artificial intelligence system may operate based on a learning model corresponding to the human brain, as described above. Herein, a paradigm of machine learning, which uses a neural network architecture with high complexity like artificial neural network, may be referred to as deep learning. In addition, neural network cores, which are used as a learning scheme, are mainly a deep neural network (DNN), a convolutional deep neural network (CNN), and a recurrent neural network (RNN). Herein, as an example referring to FIG. 11, an artificial neural network may consist of a plurality of perceptrons. Herein, when an input vector x={x1, x2, . . . , xd} is input, each component is multiplied by a weight {W1, W2, . . . , Wd}, results are all added up, and then an activation function σ( ) is applied, of which the overall process may be referred to as a perceptron. For a large artificial neural network architecture, when expanding the simplified perceptron structure illustrated in FIG. 11, an input may be applied to different multidimensional perceptrons. For convenience of explanation, an input value or an output value will be referred to as a node.

Meanwhile, the perceptron structure illustrated in FIG. 11 may be described to consist of a total of 3 layers based on an input value and an output value. An artificial neural network, which has H (d+1)-dimensional perceptrons between a 1st layer and a 2nd layer and K (H+1)-dimensional perceptrons between the 2nd layer and a 3rd layer, may be expressed as in FIG. 12.

Herein, a layer, in which an input vector is located, is referred to as an input layer, a layer, in which a final output value is located, is referred to as an output layer, and all the layers between the input layer and the output layer are referred to as hidden layers. As an example, 3 layers are disclosed in FIG. 24, but since an input layer is excluding in counting the number of actual artificial neural network layers, it can be understood that the artificial neural network illustrated in FIG. 23 has a total of 2 layers. An artificial neural network is constructed by connecting perceptrons of a basic block two-dimensionally.

The above-described input layer, hidden layer and output layer are commonly applicable not only to multilayer perceptrons but also to various artificial neural network architectures like CNN and RNN, which will be described below. As there are more hidden layers, an artificial neural network becomes deeper, and a machine learning paradigm using a sufficiently deep artificial neural network as a learning model may be referred to as deep learning. In addition, an artificial neural network used for deep learning may be referred to as a deep neural network (DNN).

Figure 13:
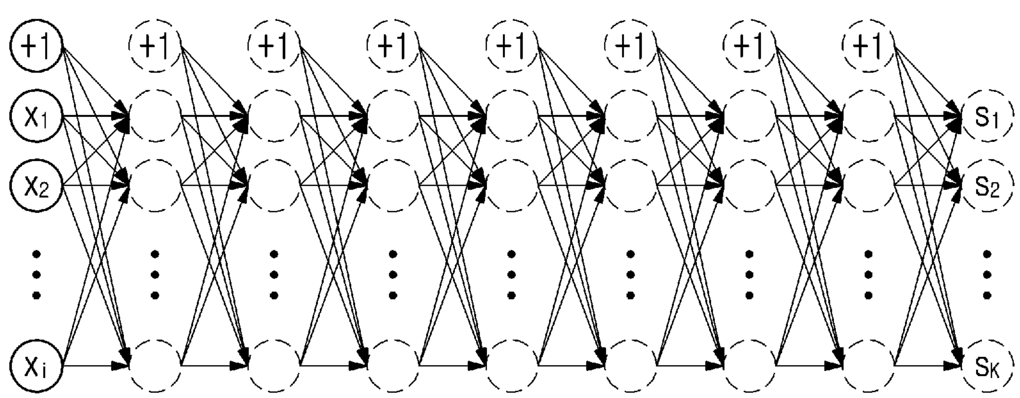
FIG. 13 illustrates a deep neural network applicable to the present disclosure.

FIG. 13 is a view showing a deep neural network applicable to the present disclosure.

Referring to FIG. 13, a deep neural network may be a multilayer perceptron consisting of 8 layers (hidden layers+output layer). Herein, the multilayer perceptron structure may be expressed as a fully-connected neural network. In a fully-connected neural network, there may be no connection between nodes in a same layer and only nodes located in neighboring layers may be connected with each other. A DNN has a fully-connected neural network structure combining a plurality of hidden layers and activation functions so that it may be effectively applied for identifying a correlation characteristic between an input and an output. Herein, the correlation characteristic may mean a joint probability between the input and the output.

Figure 14:
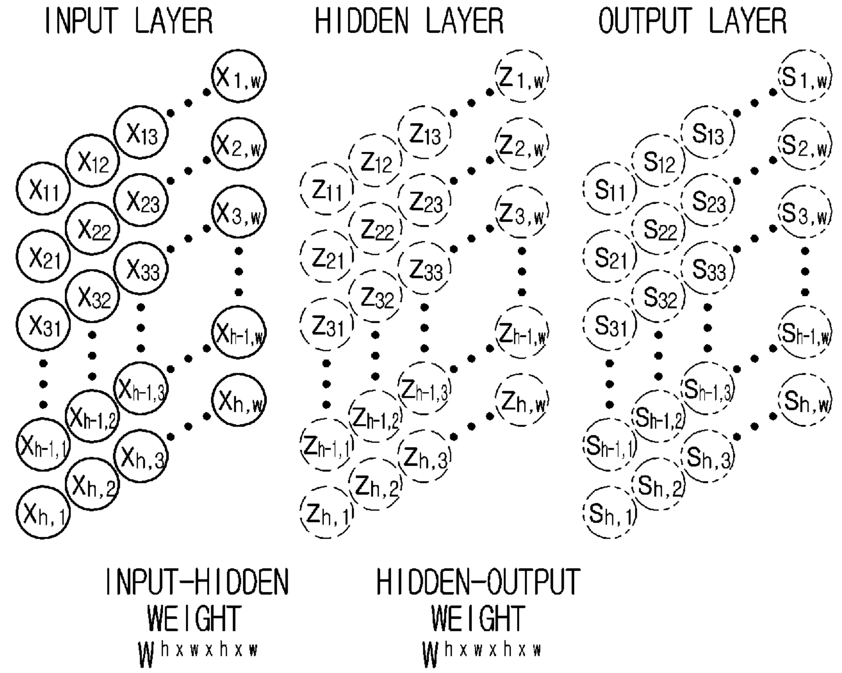
FIG. 14 illustrates a convolutional neural network applicable to the present disclosure.
Figure 15:
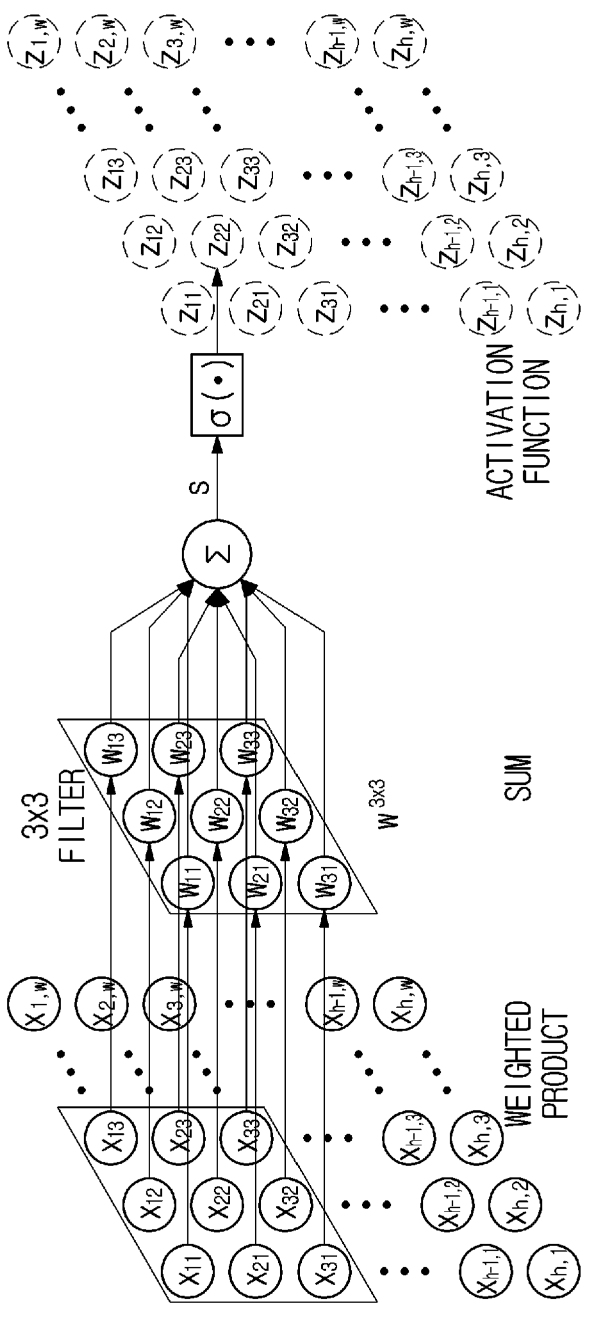
FIG. 15 illustrates a filter operation of a convolutional neural network applicable to the present disclosure.

FIG. 14 is a view showing a convolutional neural network applicable to the present disclosure. In addition, FIG. 15 is a view showing a filter operation of a convolutional neural network applicable to the present disclosure.

As an example, depending on how to connect a plurality of perceptrons, it is possible to form various artificial neural network structures different from the above-described DNN. Herein, in the DNN, nodes located in a single layer are arranged in a one-dimensional vertical direction. However, referring to FIG. 14, it is possible to assume a two-dimensional array of w horizontal nodes and h vertical nodes (the convolutional neural network structures of FIG. 14). In this case, since a weight is applied to each connection in a process of connecting one input node to a hidden layer, a total of h×w weights should be considered. As there are h×w nodes in an input layer, a total of h2w2 weights may be needed between two neighboring layers.

Furthermore, as the convolutional neural network of FIG. 14 has the problem of exponential increase in the number of weights according to the number of connections, the presence of a small filter may be assumed instead of considering every mode of connections between neighboring layers. As an example, as shown in FIG. 15, weighted summation and activation function operation may be enabled for a portion overlapped by a filter.

At this time, one filter has a weight corresponding to a number as large as its size, and learning of a weight may be performed to extract and output a specific feature on an image as a factor. In FIG. 15, a 3×3 filter may be applied to a top rightmost 3×3 area of an input layer, and an output value, which is a result of the weighted summation and activation function operation for a corresponding node, may be stored at z22.

Herein, as the above-described filter scans the input layer while moving at a predetermined interval horizontally and vertically, a corresponding output value may be put a position of a current filter. Since a computation method is similar to a convolution computation for an image in the field of computer vision, such a structure of deep neural network may be referred to as a convolutional neural network (CNN), and a hidden layer created as a result of convolution computation may be referred to as a convolutional layer. In addition, a neural network with a plurality of convolutional layers may be referred to as a deep convolutional neural network (DCNN).

In addition, at a node in which a current filter is located in a convolutional layer, a weighted sum is calculated by including only a node in an area covered by the filter and thus the number of weights may be reduced. Accordingly, one filter may be so used as to focus on a feature of a local area. Thus, a CNN may be effectively applied to image data processing for which a physical distance in a two-dimensional area is a crucial criterion of determination. Meanwhile, a CNN may apply a plurality of filters immediately before a convolutional layer and create a plurality of output results through a convolution computation of each filter.

Meanwhile, depending on data properties, there may be data of which a sequence feature is important. A recurrent neural network structure may be a structure obtained by applying a scheme, in which elements in a data sequence are input one by one at each timestep by considering the distance variability and order of such sequence datasets and an output vector (hidden vector) output at a specific timestep is input with a very next element in the sequence, to an artificial neural network.

Figure 16:
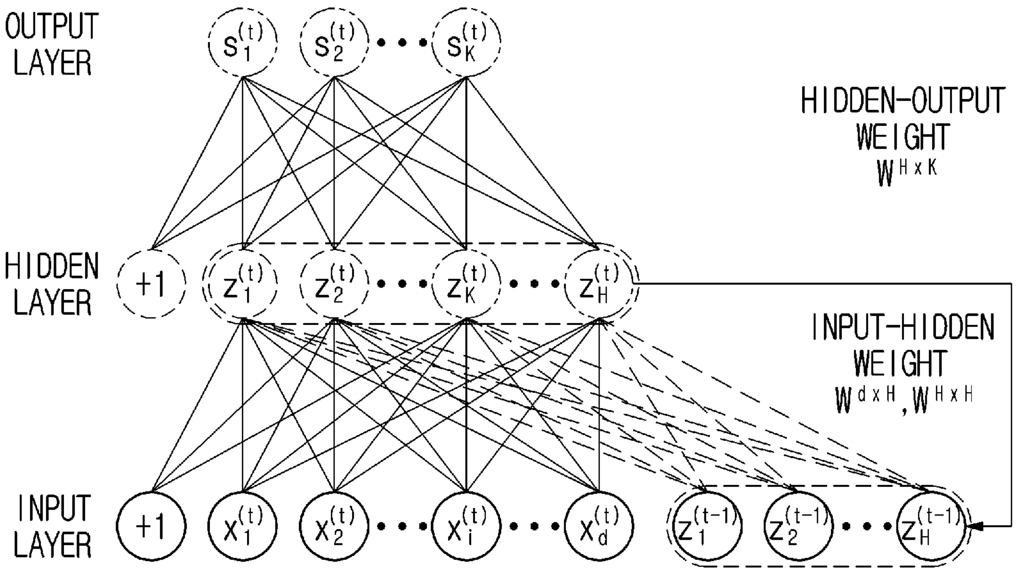
FIG. 16 illustrates a neural network architecture with a recurrent loop applicable to the present disclosure.
Figure 17:
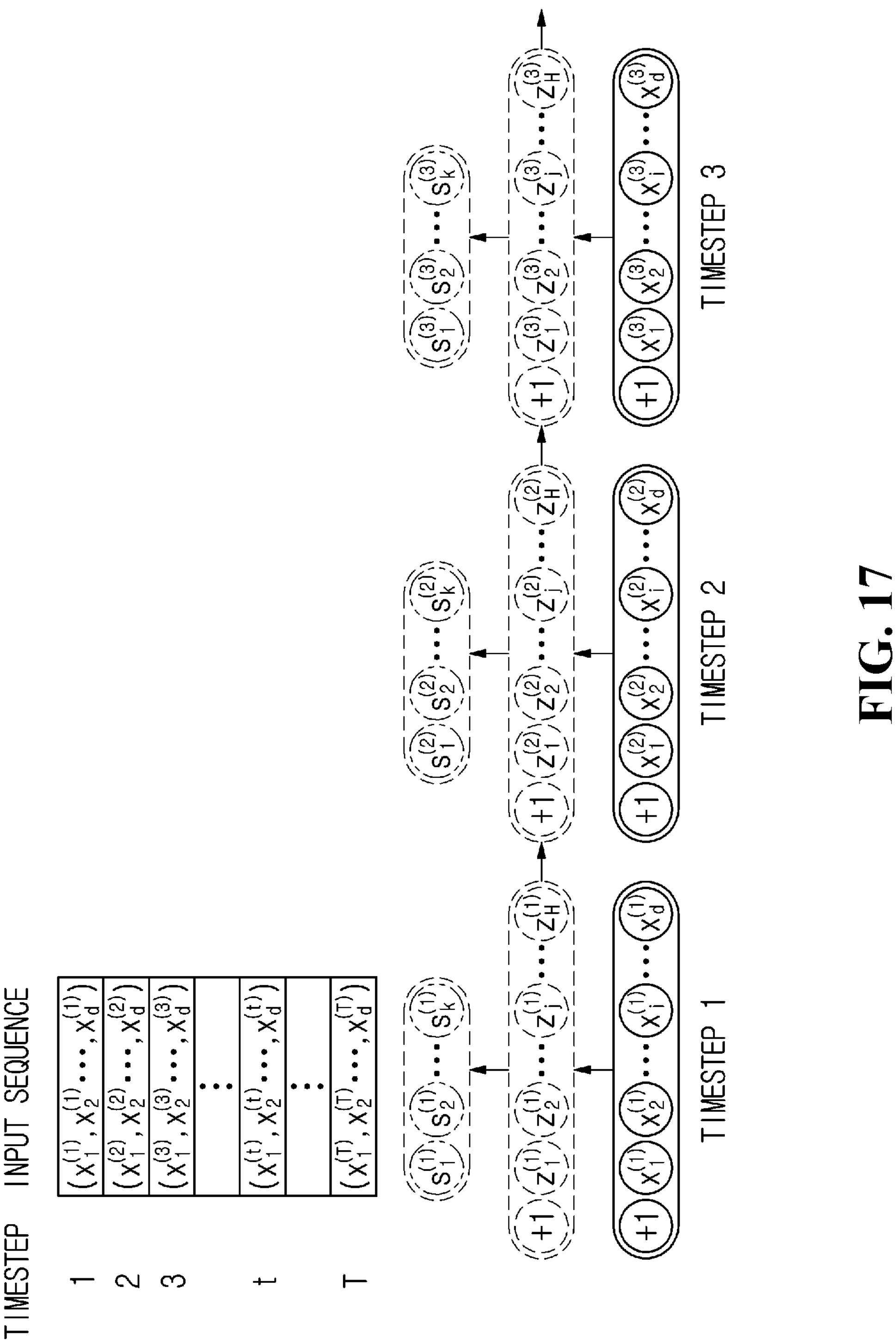
FIG. 17 illustrates an operational structure of a recurrent neural network applicable to the present disclosure.

FIG. 16 is a view showing a neural network architecture with a recurrent loop applicable to the present disclosure. FIG. 17 is a view showing an operational structure of a recurrent neural network applicable to the present disclosure.

Referring to FIG. 16, a recurrent neural network (RNN) may have a structure which applies a weighted sum and an activation function by inputting hidden vectors {z1(t−1), z2(t−1), . . . , zH(t−1)} of an immediately previous timestep t−1 during a process of inputting elements {x1(t), x2(t), . . . , xd(t)} of a timestep t in a data sequence into a fully connected neural network. The reason why such hidden vectors are forwarded to a next timestep is because information in input vectors at previous timesteps is considered to have been accumulated in a hidden vector of a current timestep.

In addition, referring to FIG. 17, a recurrent neural network may operate in a predetermined timestep order for an input data sequence. Herein, as a hidden vector {z1(1), z2(1), . . . , zH(1)} at a time of inputting an input vector {x1(t), x2(t), . . . , xd(t)} of timestep 1 into a recurrent neural network is input together with an input vector {x1(2), x2(2), . . . , xd(2)} of timestep 2, a vector {z1(2), z2(2), . . . , zH(2)} of a hidden layer is determined through a weighted sum and an activation function. Such a process is iteratively performed at timestep 2, timestep 3 and until timestep T.

Meanwhile, when a plurality of hidden layers are allocated in a recurrent neural network, this is referred to as a deep recurrent neural network (DRNN). A recurrent neural network is so designed as to effectively apply to sequence data (e.g., natural language processing).

Apart from DNN, CNN and RNN, other neural network cores used as a learning scheme include various deep learning techniques like restricted Boltzmann machine (RBM), deep belief networks (DBN) and deep Q-Network, and these may be applied to such areas as computer vision, voice recognition, natural language processing, and voice/signal processing.

Recently, there are attempts to integrate AI with a wireless communication system, but these are concentrated in an application layer and a network layer and, especially in the case of deep learning, in a wireless resource management and allocation filed. Nevertheless, such a study gradually evolves to an MAC layer and a physical layer, and there are attempts to combine deep learning and wireless transmission especially in a physical layer. As for a fundamental signal processing and communication mechanism, AI-based physical layer transmission means application of a signal processing and communication mechanism based on an AI driver, instead of a traditional communication framework. For example, it may include deep learning-based channel coding and decoding, deep learning-based signal estimation and detection, deep learning-based MIMO mechanism, and AI-based resource scheduling and allocation.

Specific Embodiments of the Present Disclosure

The present disclosure relates to voice communication in a wireless communication system and relates to technology of performing voice communication based on text data obtained from voice data.

Efforts to increase the data transmission amount of wireless communication systems are continuously underway. For example, in 5G and 4G, VoLTE (voice over LTE) has been adopted. VoLTE is a protocol that transmits voice data using a packet method rather than an existing circuit method, and is a technology that makes voice calls possible in LTE, which is a high-speed data communication packet network, like the existing circuit network. Voice traffic transmitted through VoLTE may have a frame form in AMR (Adaptive Multi-Rate) format.

5G also supports voice communication in the same way as VoLTE for high-speed voice call services. However, as the frequency band increases, the wavelength becomes shorter, which shortens the range of radio waves. In other words, while straightness of the signal is good, diffraction is poor, so high-definition calls may be difficult or call quality may be poor. This is a phenomenon that commonly occurs when users are placed in a non-line of sight (NLOS) environment, and to overcome this, a new high-efficiency voice transmission method that can perform transmission at a lower capacity is needed.

Voice data does not require a large data rate for one user. However, in the case of next-generation communication, where there will be an increase in services requiring ultra-high capacity transmission, such as 3D video and remote driving video, a large number of frequency bandwidths that may be operated by one base station may be allocated to ultra-high capacity services. In this case, for services that are required to be provided without interruption, such as voice calls, a method is needed to prevent communication disconnection and improve quality through optimization of the data transmission rate.

In accordance with the requirements related to voice calls described above, more advanced voice call technology may be adopted in the 6G system. For example, new voice call technology utilizing AI technology may be used. However, when initially installing a commercial network for the 6G system, it is expected that the network will be installed first in large cities, and in this case, it may be difficult to provide 6G-specific voice/video call services in all areas. If the 6G system seeks to provide seamless voice/video services across the entire 5G and 6G network through linkage with the existing 5G VoNR (voice over new radio), supporting a fallback function to VoNR service may be considered.

Previously, a CS (circuit switch) fallback function was supported in the LTE network. The CS fallback function provides a call service using the 3G CS network when a terminal registered in the LTE network attempts a voice call. In other words, data services are provided through the LTE network, and call services are provided through CS. For this purpose, voice calls are processed through fallback to 2G/3G networks. When a terminated call is made to a terminal connected to the LTE network, the LTE network attempts paging for the terminal, the terminal switches to the CS network, and then responds to the terminated call through the CS network. Accordingly, control of subsequent calls proceeds in the CS network.

According to the CS fallback procedure, a mobile switching center (MSC)/visitor location register (VLR) receives a message indicating the occurrence of a mobile-end call and identifies the corresponding mobility management entity (MME). Next, the MSC/VLR transmits a paging message to the MME, and the MME transmits the paging message to the LTE mobile terminal. The paging message includes an indicator indicating that the call is a CS service, and the mobile terminal, which has identified the call, transmits a CS fallback service request signal to the MME. Afterwards, handover to the 3G system is performed. The mobile terminal converted into 3G transmits a paging response message to the registered MSC/VLR. Finally, the terminated call procedure is performed in the 3G system, and the CS fallback procedure is completed. As described above, fallback of voice calls to 3G CS that is paired with the LTE network may be performed. However, since the CS fallback method transmits an unconditional paging response to the designated existing network when paging occurs, efficiency is not guaranteed.

Figure 18:
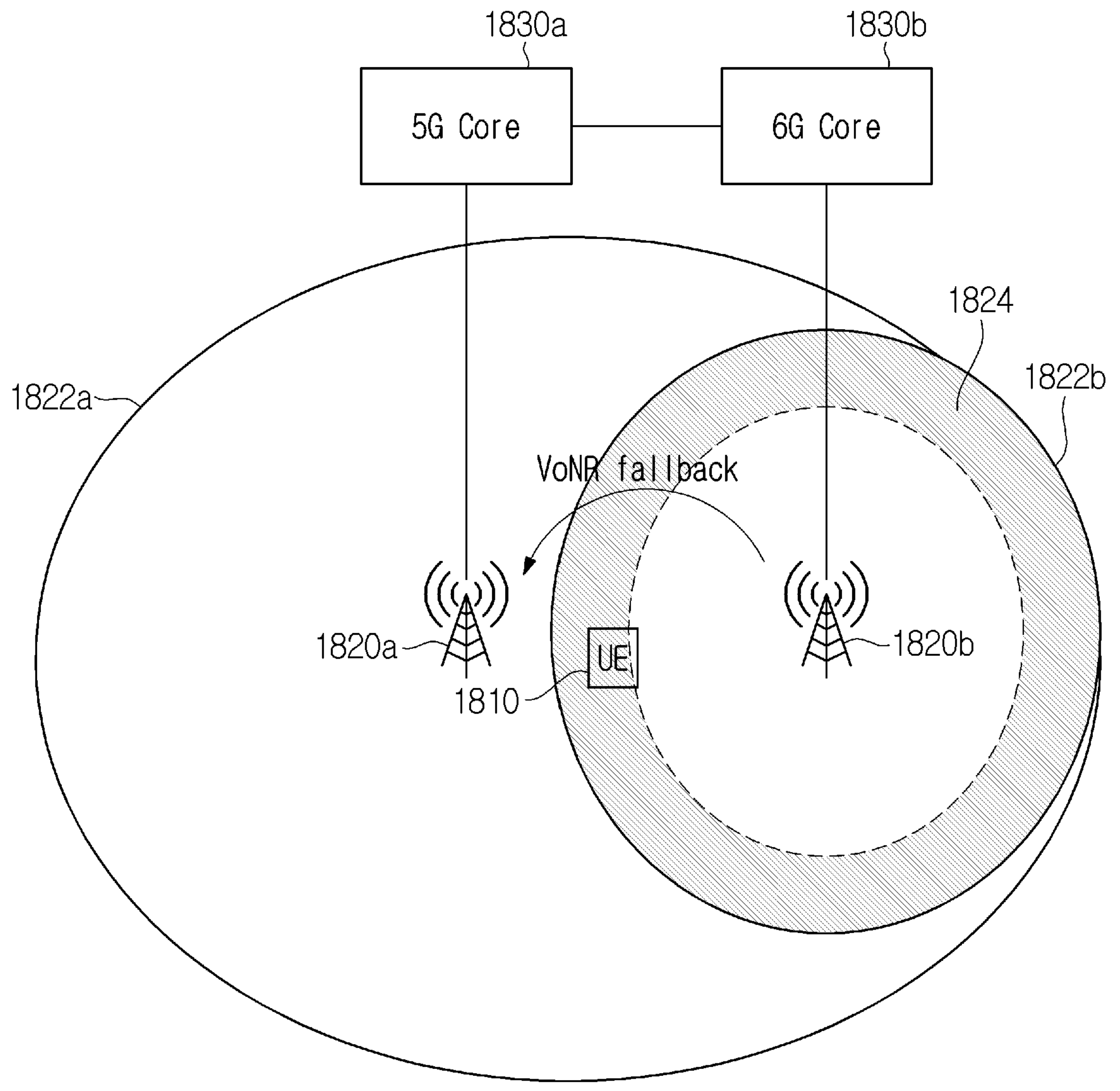
FIG. 18 illustrates the concept of call service fallback in a wireless communication system according to an embodiment of the present disclosure.

FIG. 18 illustrates the concept of call service fallback in a wireless communication system according to an embodiment of the present disclosure. FIG. 18 illustrates the concept of VoNR fallback from a 6G network to a 5G network.

Referring to FIG. 18, a 5G base station 1820*a* connected to a 5G core 1830*a* has a wide coverage 1822*a*, and a 6G base station 1820*b* connected to a 6G core 1830*b* has a relatively narrow coverage 1822*b*. A UE 1810 may move between two coverages 1822*a* and 1822*b*. As shown in FIG. 18, the UE 1810 may be located in a border area 1824 of the coverage 1822*b* while camping in the 6G network. At this time, when a mobile terminate (MT) call, that is, a terminated call, occurs to the UE 1810, the 6G base station 1820*b* transmits a paging message to the UE 1810. In this case, because the UE 1810 is located in the border area 1824, continuity of the quality of a call service through the 6G base station 1820*b* may not be guaranteed. Accordingly, the UE 1810 may perform fallback for the call service to the 5G network. That is, the UE 1810 may transmit a response to paging to the 5G base station 1820*a* and use the call service in the 5G network.

As such, VoNR fallback according to various embodiments is a function for the UE 1810 to perform fallback to the 5G NR network to respond to a paging request to the 5G base station 1820 and process a voice/video call when being located in the fallback area (e.g., the border area 1824) if the UE 1810 receives paging from the 6G base station 1820*b* as a mobile terminate (MT) call occurs while the UE 1810 is camping in the 6G network. In other words, when the UE 1810 registered in the 6G network attempts a voice/video call, the call service may be used without interruption using the 5G network. In addition, the VoNR fallback method according to various embodiments may be used in other services such as video calls in addition to 6G voice calls.

Figure 19:
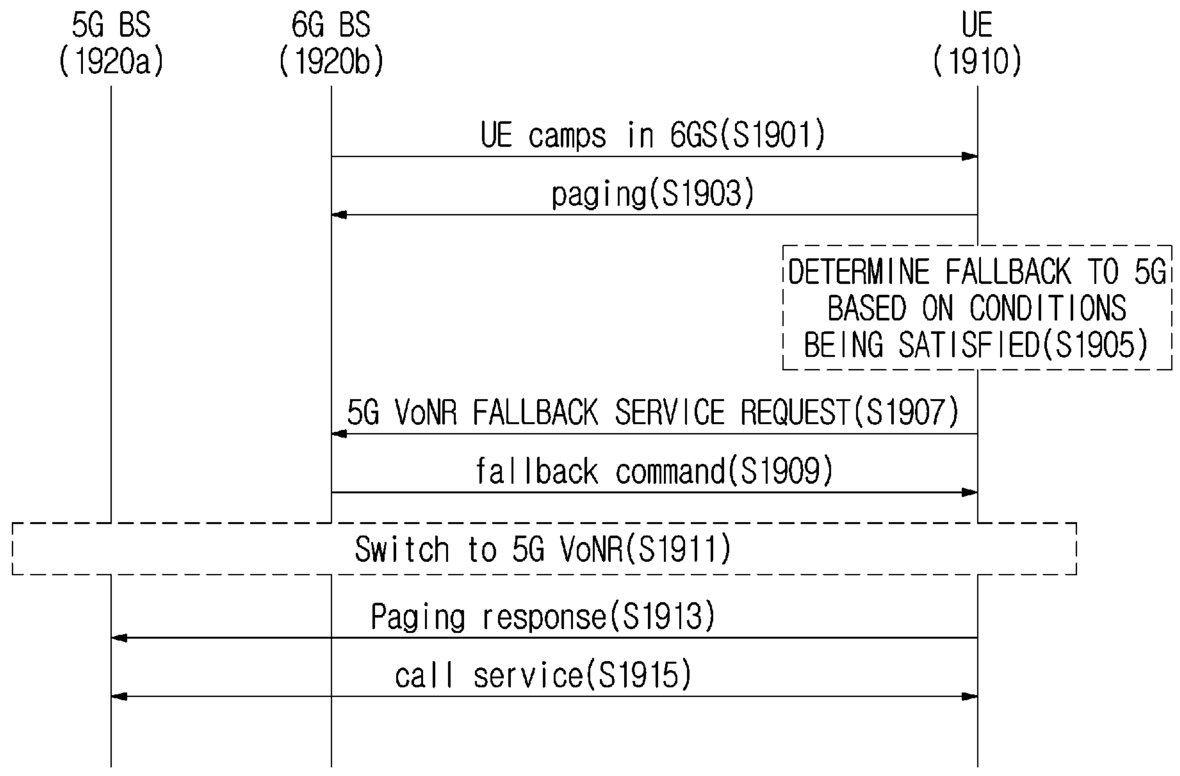
FIG. 19 illustrates an example of a procedure for call service fallback in a wireless communication system according to an embodiment of the present disclosure.

FIG. 19 illustrates an example of a procedure for call service fallback in a wireless communication system according to an embodiment of the present disclosure. FIG. 19 illustrates signal exchange for VoNR fallback between a 5G base station 1920*a*, a 6G base station 1920*b*, and a UE 1910.

Referring to FIG. 19, in step S1901, the UE 1910 camps in the 6G network. To this end, the UE 1910 may receive a synchronization signal, system information, etc. transmitted from the 6G base station 1920*b*.

In step S1903, the 6G base station 1920*b* transmits a paging message to the UE 1910. That is, as a terminated call occurs to the UE 1910, the 6G base station 1920*b* transmits a paging message notifying the UE of the terminated call. According to various embodiments, the paging message may include information related to VoNR fallback.

In step S1905, the UE 1910 determines whether the conditions for VoNR fallback are satisfied. In the present embodiment, it is assumed that the conditions are satisfied. Accordingly, the UE 1910 determines fallback to 5G.

In step S1907, the UE 1910 transmits a request message to request a VoNR fallback service to the 6G base station 1920*b*. The request message may include at least one of identification information of the UE 1910 or information related to determining whether the conditions are satisfied.

In step S1909, the 6G base station 1920*b* transmits a command message indicating VoNR fallback to the UE 1910. The command message may include at least one of an indicator indicating whether to accept VoNR fallback or information required to access the 5G base station 1920*a*.

In step S1911, the UE 1910 and the 5G base station 1920*a* perform signaling for switching to the 5G network. For example, the UE 1910 may acquire synchronization with the 5G base station 1920*a* and perform random access. At this time, the 6G base station 1920*b* may provide information about the UE 1910 to the 5G base station 1920*a*.

In step S1913, the UE 1910 transmits a paging response message to the 5G base station 1920*a*. The paging response message may include at least one of identification information of the UE 1910 or information related to the paging request.

In step S1915, the UE 1910 uses a call service through the 5G base station 1920*a*. That is, the UE 1910 uses the VoNR-type call service provided by the 5G network. Accordingly, the UE may receive a call service without interruption using a 5G network with relatively wide coverage.

As explained with reference to FIG. 19, the terminal does not always perform fallback to the 5G network when a terminated call occurs, and requests VoNR fallback when the conditions for fallback are satisfied. The operations of the base station and the terminal supporting VoNR fallback according to various embodiments are shown in FIGS. 20 and 21 below.

Figure 20:
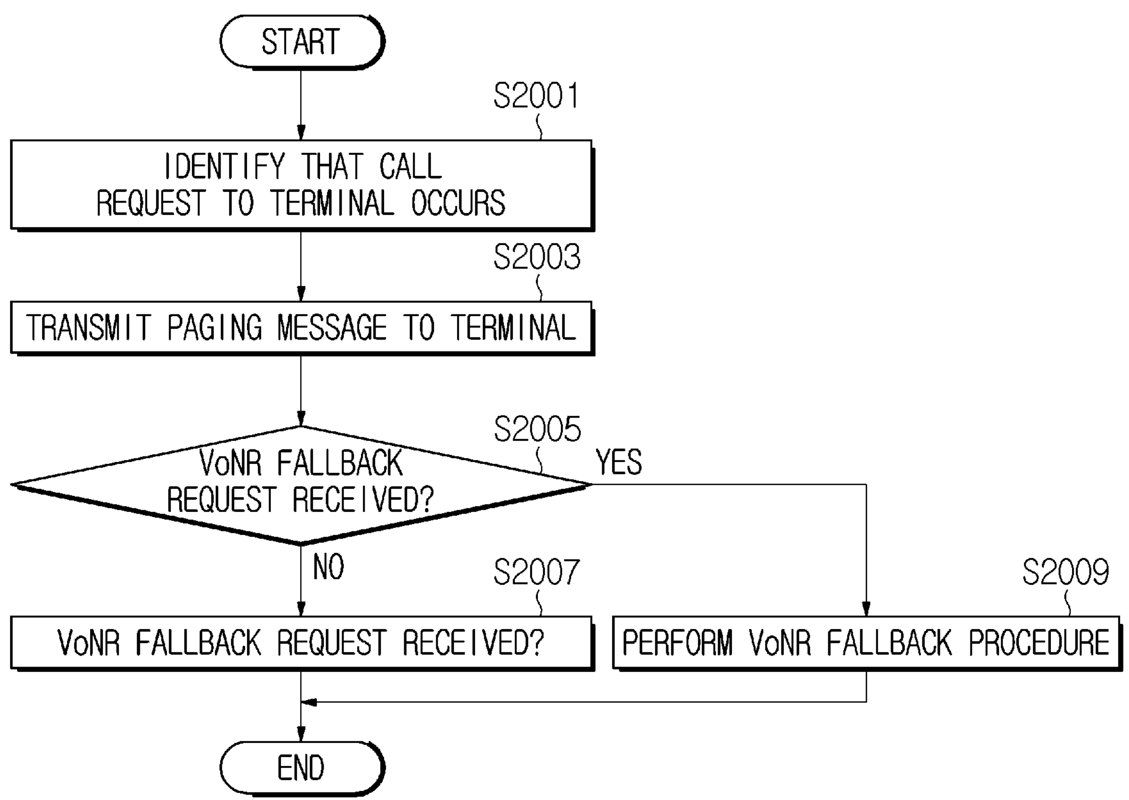
FIG. 20 illustrates an example of a procedure for supporting call service fallback in a wireless communication system according to an embodiment of the present disclosure.
Figure 21:
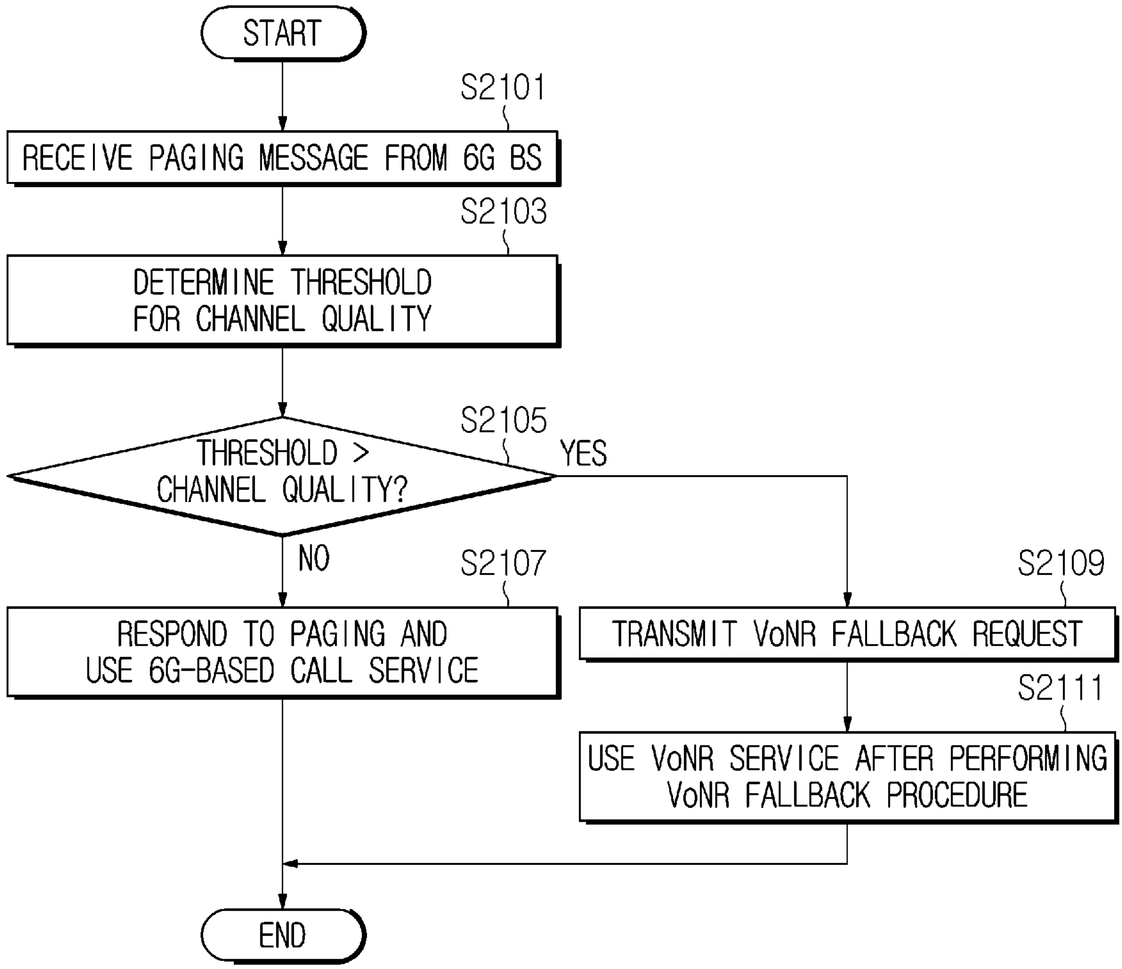
FIG. 21 illustrates an example of a procedure for using a call service in a wireless communication system according to an embodiment of the present disclosure.

FIG. 20 illustrates an example of a procedure for supporting call service fallback in a wireless communication system according to an embodiment of the present disclosure. FIG. 20 illustrates a method of operating a base station (e.g., 6G base station 1820*b* or 6G base station 1920*b*).

Referring to FIG. 20, in step S2001, the base station identifies that a call request to a terminal occurs. The base station receives a message indicating that a terminated call has occurred from an upper node to the terminal. In other words, the base station receives a message requesting to page the terminal from the upper node.

In step S2003, the base station transmits a paging message to the terminal. The base station transmits, to the terminal, a message indicating that a terminated call to the terminal has occurred. The message may include at least one of an indicator indicating the occurrence of a terminated call or an indicator indicating the type of call service provided through the base station (e.g., style communication). If the terminal is in an idle state, the base station instructs the terminal to transition to a connected mode. According to various embodiments, the terminal determines whether to perform VoNR fallback based on channel quality. Accordingly, the message may further include information indicating the range of a threshold for channel quality.

In step S2005, the base station checks whether a VoNR fallback request is received. Whether or not VoNR fallback is performed is determined by the terminal. Therefore, the base station checks whether a message requesting VoNR fallback is received from the terminal. According to one embodiment, for clarity of the procedure, one of a message requesting VoNR fallback or a message indicating that a call service will be performed in a 6G network without VoNR fallback may be received.

If the VoNR fallback request is not received, in step S2007, the base station provides a 6G-based call service. The base station may establish at least one of a connection, flow, and bearer for a call service to the terminal, and may transmit and receive voice data using the established bearer. At this time, the voice data may follow a different format from VoNR-based voice data.

When a VoNR fallback request is received, in step S2009, the base station performs a VoNR fallback procedure. For example, the base station may control the terminal to access the 5G network and provide information about the terminal to the 5G network. At this time, if a service other than a call service is being provided, the base station may control the terminal to maintain connections to both the 6G network and the 5G network.

FIG. 21 illustrates an example of a procedure for using a call service in a wireless communication system according to an embodiment of the present disclosure. FIG. 21 illustrates a method of operating a terminal (e.g., UE 1810 or UE 1910).

Referring to FIG. 21, in step S2101, the terminal receives a paging message from a base station (e.g., 6G base station 1820*b* or 6G base station 1920*b*). In other words, the terminal receives, from the base station, a message indicating that a terminated call has occurred to the terminal. According to one embodiment, the message may include at least one of an indicator indicating the occurrence of a terminated call, an indicator indicating the type of call service provided through the base station (e.g., style communication), or information indicating the range of a threshold for channel quality.

In step S2103, the terminal determines a threshold for channel quality. According to various embodiments, the terminal determines whether to perform VoNR fallback based on channel quality. Accordingly, the terminal determines a threshold for comparison with current channel quality. At this time, the terminal may determine the threshold within the range indicated by the information included in the message received in step S2101. Here, the channel quality may include reference signal received power (RSRP).

In step S2105, the terminal compares the current channel quality and threshold. In other words, the terminal measures the current channel quality and determines whether to perform VoNR fallback based on the measured channel quality.

If the channel quality is less than or equal to the threshold, in step S2107, the terminal responds to paging and then uses the 6G-based voice service. For example, the terminal may establish at least one of a connection, flow, and bearer for a call service, and transmit and receive voice data using the established bearer. At this time, the voice data may follow a different format from VoNR-based voice data.

If the channel quality is greater than the threshold, in step S2109, the terminal transmits a VoNR fallback request. In other words, the terminal transmits a message requesting VoNR fallback to the base station. Accordingly, although not shown in FIG. 21, the terminal may receive a message commanding VoIR fallback.

In step S2111, the terminal uses the VoNR service after performing the VoNR fallback procedure. For example, the terminal may acquire synchronization with the 5G base station, perform a random access procedure, and then establish a connection. The terminal may transmit a response to the paging message received in step S2101 to the 5G base station. While using the VoNR service, the terminal may maintain a connection with the 6G base station and receive services other than the call service through the 6G base station.

As described with reference to FIG. 21, the terminal determines whether to perform VoNR fallback based on channel quality. To determine whether to perform VoNR fallback, a threshold for channel quality is determined, and the threshold may be determined according to various methods. According to one embodiment, the threshold may be determined based on thresholds used in the past and a paging success probability for each of the thresholds. To this end, although not shown in FIG. 21, the terminal may cumulatively record information on whether paging is successful, that is, whether a call drop occurs, when using a call service in a 6G network. Through this, the terminal may obtain paging success probability information of the applied threshold. Here, a criterion for determining whether a call drop occurs may be defined in various ways, for example, according to whether the call is connected and at least one voice packet is exchanged, whether the call lasts more than a threshold time, and whether quality of service (QoS) for the call is maintained for more than a threshold time. An embodiment of determining the threshold based on past paging success probability is shown in FIG. 22 below.

Figure 22:
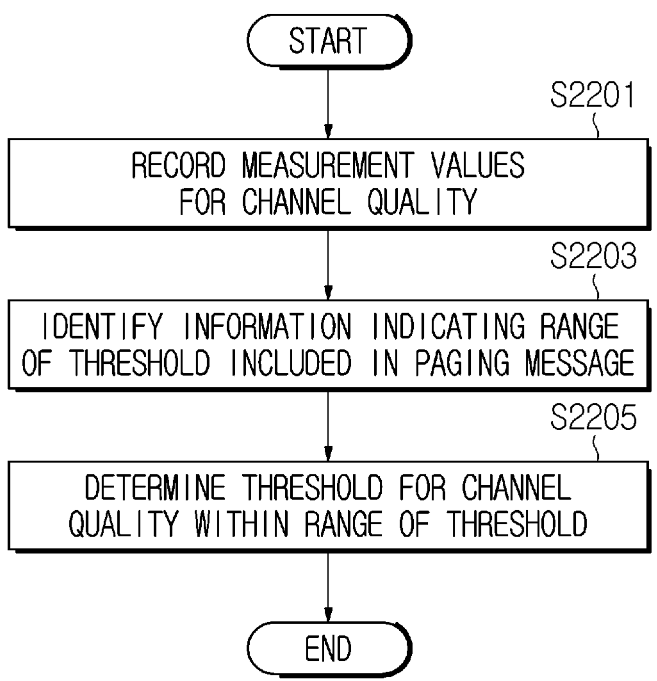
FIG. 22 illustrates an example of a procedure for determining a threshold for call service fallback in a wireless communication system according to an embodiment of the present disclosure.

FIG. 22 illustrates an example of a procedure for determining a threshold for call service fallback in a wireless communication system according to an embodiment of the present disclosure. FIG. 22 illustrates a method of operating a terminal (e.g., UE 1810 or UE 1910).

Referring to FIG. 22, in step S2201, the terminal records measurement values for channel quality. For example, the terminal may periodically record measurement values for channel quality at regular time intervals. In other words, the terminal may continuously monitor channel quality while camping in the network and periodically store measurement values. At this time, according to one embodiment, the terminal may store only a set number of measurement values. In this case, if the number of stored measurement values exceeds the set number, the terminal may delete the oldest recorded measurement value. Here, according to one embodiment, the number of measurement values to be recorded, the recording period, etc. may be predefined or configured from the base station. That is, although not shown in FIG. 22, the terminal may receive configuration information related to recording of channel quality measurement values from the base station.

In step S2203, the terminal identifies information indicating the range of the threshold for channel quality included in the paging message. That is, the paging message includes information indicating the range of the threshold, and the terminal may check the upper and lower limits of the threshold through the paging message.

In step S2205, the terminal determines a threshold for channel quality within a specified range. The terminal may determine the threshold based on the upper and lower limits of the threshold, recorded channel quality measurement values, and the paging success probability for thresholds used in the past. Here, the paging success probability means the probability that paging was successful, that is, a call drop did not occur in a situation where the corresponding threshold was used in the past. According to one embodiment, the terminal may determine the threshold using a technique for solving an optimization problem. For example, the terminal may determine the threshold based on BO (Bayesian optimization) technique. In this case, recorded channel quality measurements and paging success probability of the past thresholds may be used as prior knowledge.

As described above, the threshold may be determined based on one of various algorithms for solving the optimization problem. For example, the BO technique may be used as an optimization algorithm. The BO technique is explained as follows.

The BO technique is a useful optimization algorithm for optimizing functions that are expensive to evaluate. The BO technique provides an optimal experimental path with a minimum of experiments by updating the posterior based on prior knowledge using a surrogate function and acquisition function. In addition, the BO technique is evaluated as an efficient search methodology that optimizes an objective function by using previously obtained data as prior knowledge. Here, the surrogate function is a model used to approximate the objective function f, and for example, GP (Gaussian Process), TPE (Tree-structured Parzen Estimator), etc. may be used as the surrogate function. The acquisition function provides a criterion for determining the next evaluation point, and for example, Probability of Improvement (PI), Expected Improvement (EI), Upper Confidence Bound (UCB), etc. may be used as the acquisition function. The BO algorithm may be expressed as Table 2 below.

TABLE 2

| |
|---|
| for t=1,2,... do: |
| Find the next sampling point x_t by optimizing the acquisition function over the GP : $x_t = \text{argmax}_x\, u(x \mid D_{1:t-1})$ |
| Sample the objective function f : $y_t = f(x_t) + \varepsilon_t$. |
| Add the sample to previous samples $D_{1:t} = \{D_{1:t-1}, (x_t, y_t)\}$ and update the GP. |
| end for |

Referring to Table 2, according to the BO technique, the prior is updated using the samples obtained from the objective function f, and a next sampling point is obtained based on the acquisition function indicating sampling in a region where there is a possibility of improvement over the current best observation. Thereafter, at the next experimental point, the $D_{1:t}$ posterior is updated by adding the result (xt,yt) obtained by the objective function to the previous sample domain. Examples of the objective function, surrogate function, and acquisition function are shown in FIG. 23 below.

Figure 23:
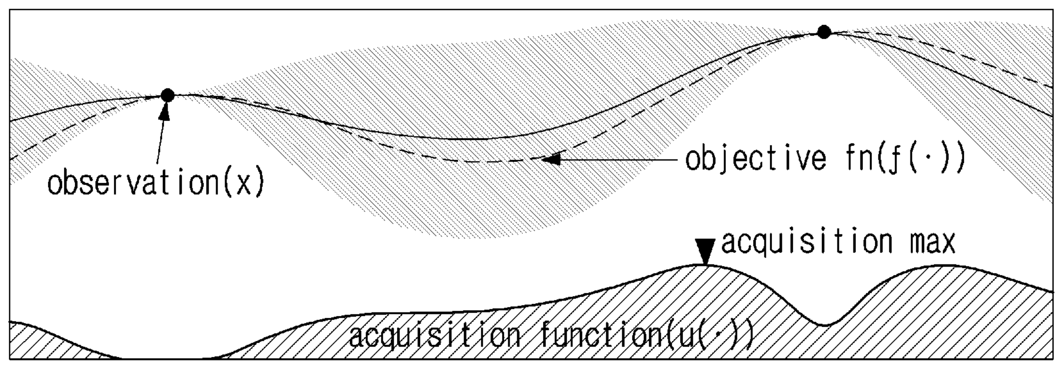
FIG. 23 illustrates an example of functions for a BO technique applicable to determine a threshold for call service fallback in a wireless communication system according to an embodiment of the present disclosure.

FIG. 23 illustrates an example of functions for a BO technique applicable to determine a threshold for call service fallback in a wireless communication system according to an embodiment of the present disclosure. Referring to FIG. 23, a surrogate function is a function for tracking an objective function and is updated using an observation. At this time, at points other than the observation, a certain range of variation for the objective function is calculated. The point with a maximum value in the acquisition function will be selected as a next experimental point. Accordingly, new observations will be added and the surrogate function will be updated to be closer to the objective function.

In order to determine whether to perform VoNR fallback based on the above-described BO technique, the terminal camping in the 6G network logs the history of the channel quality and waits for paging. In addition, the terminal holds statistical information about the paging success probability for thresholds used in the past. A paging message for a paging request may include range information of the threshold for channel quality and the method of the 6G-based call service. For example, if the range of the threshold is −70 dB to −65 dB, the terminal may perform optimization using the BO technique in the range −70 dB to −65 dB. The terminal that has received the paging message determines a new threshold through BO, and performs VoNR fallback if the current channel quality is greater than the threshold. A hyper parameter for the BO technique may be set to a threshold, and the X-axis of the target model may be set to the history of channel quality and the paging success probability for each past threshold. The history of channel quality may include N recent channel quality measurement values. The Y axis of the target model may be set to whether paging is successful or not. The history of channel quality and whether paging is successful or not are input as prior knowledge $D_{1:t-1}$ of the GP, and the next experimental point is determined to maximize the threshold for channel quality using an acquisition function. The determination of the next experimental point may be shown in [Equation 1] below.

[Equation 1]

In [Equation 1], $T_{RSRP}$, represents a threshold determined as the next experimental point, $D_{1:t-1}$ represents prior knowledge, and u( ) represents an acquisition function.

To maximize the paging success probability, the BO technique may use acquisition functions such as EI, PI, and UCB as utility functions to perform exploration-exploitation.

Figure 24:
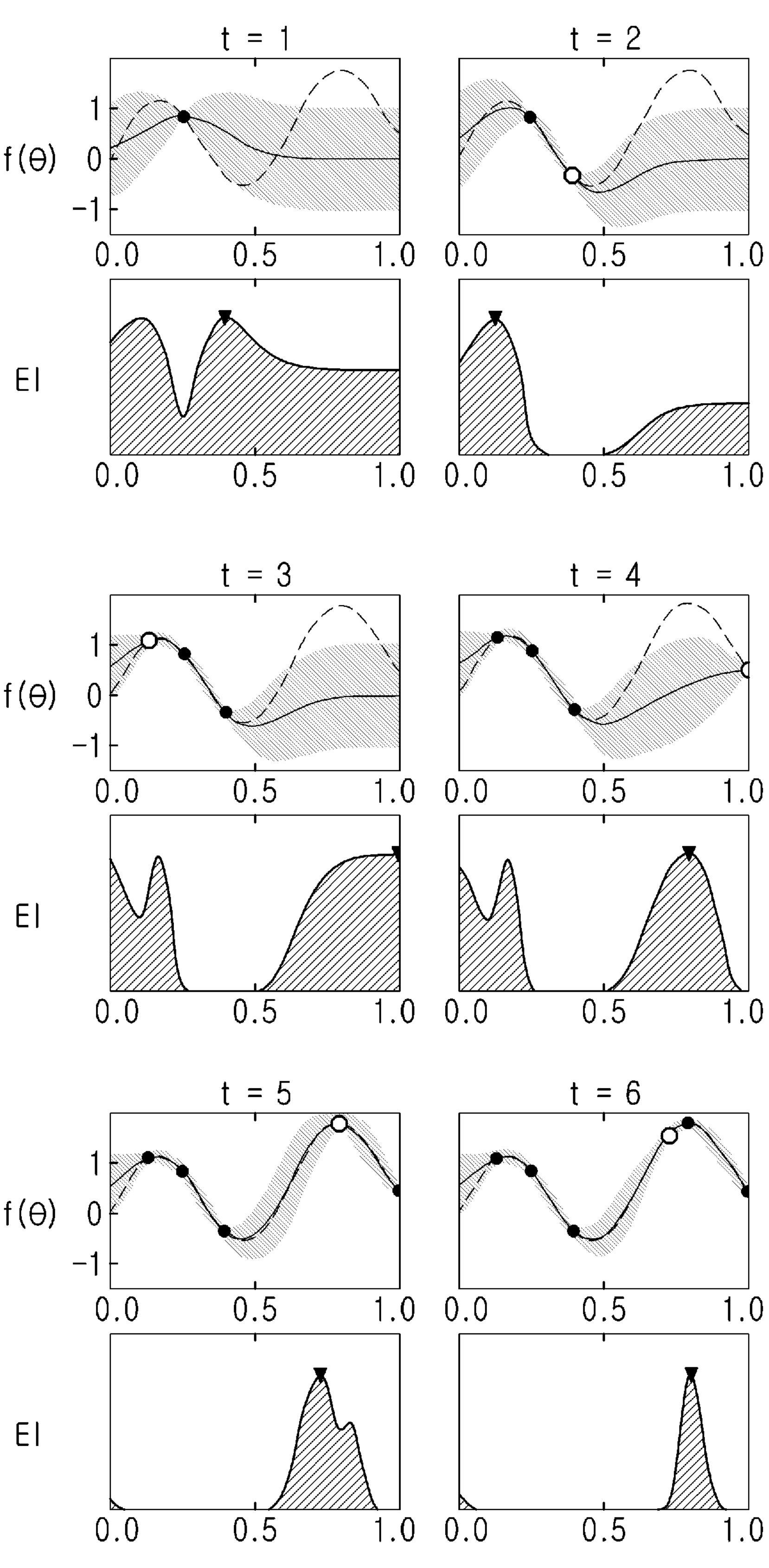
FIG. 24 illustrates an example of optimization search according to a BO technique applicable to determine a threshold for call service fallback in a wireless communication system according to an embodiment of the present disclosure.

An example of the process of updating the surrogate function according to the above-described BO technique is shown in FIG. 24 below. FIG. 24 illustrates an example of optimization search according to a BO technique applicable to determine a threshold for call service fallback in a wireless communication system according to an embodiment of the present disclosure. FIG. 24 illustrates a case where GP is used as a surrogate function and EI is used as an acquisition function, using observations obtained through six experiments.

Referring to FIG. 24, during t=1 to t=6, six observations are used sequentially, and the observation position at each time point is determined by the EI at a previous time point. Through six experiments, the surrogate function becomes very close to the target function, and thus optimized results may be obtained. In FIG. 24, the X-axis of the graph is set to the range of 0.0 to 1.1, and the Y-axis is set to the range of −1 to 1. When applied to determining a threshold for whether to perform VoNR fallback according to various embodiments, the X-axis is set to the range of the lower to upper limits of the threshold signaled by the base station and the Y-axis is set to the range of 0 to 1 indicating the paging success probability. Here, the paging success probability refers to a success probability considering the latest recorded channel quality measurement values. In other words, the success probability obtained when the channel quality changes in the same pattern as the N latest measurement values recorded by the terminal is used to determine a new threshold.

As described above, in a situation where a 6G network and a 5G network coexist, VoNR fallback may be performed in case the 6G-based call service cannot continue. At this time, the 6G-based call service is different from VoNR and can be designed in various ways. For example, the 6G-based call service may generate voice data in the form of text data and assistance data so that voice data may be provided at a relatively low data rate. Hereinafter, a call service using the format of text data and assistance data will be described as a technology that may be used as the 6G-based call service.

With the development of deep-learning techniques, voice synthesis systems have become able to synthesize voice that can clearly convey the meaning of the context contained in input text. Furthermore, the voice synthesis system can provide lively voice similar to the human voice by utilizing acoustic features related to prosody, such as pitch, stress, and speaking speed. An example of such a voice synthesis system includes Tacotron. Prosody embedding is extracted through a reference encoder in which mel-spectrogram of audio consists of a gated recurrent unit (GRU) cell, and the extracted prosody embedding is combined with embedding of a text encoder, thereby synthesizing voices capable of expressing emotions. Here, embedding refers to the operation or result of converting a discrete categorical value into a vector composed of continuous numbers.

Figure 25A:
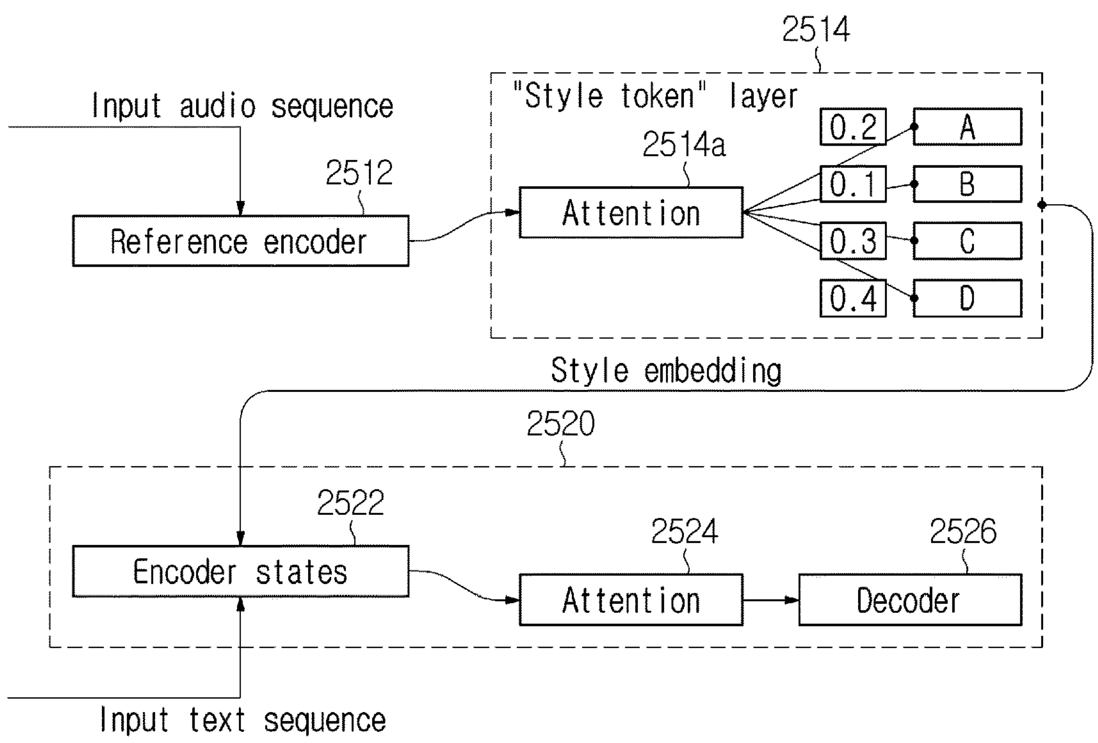
FIGS. 25*a* and 25*b* show an outline of artificial intelligence-based voice synthesis technology applicable to the present disclosure.
Figure 25B:
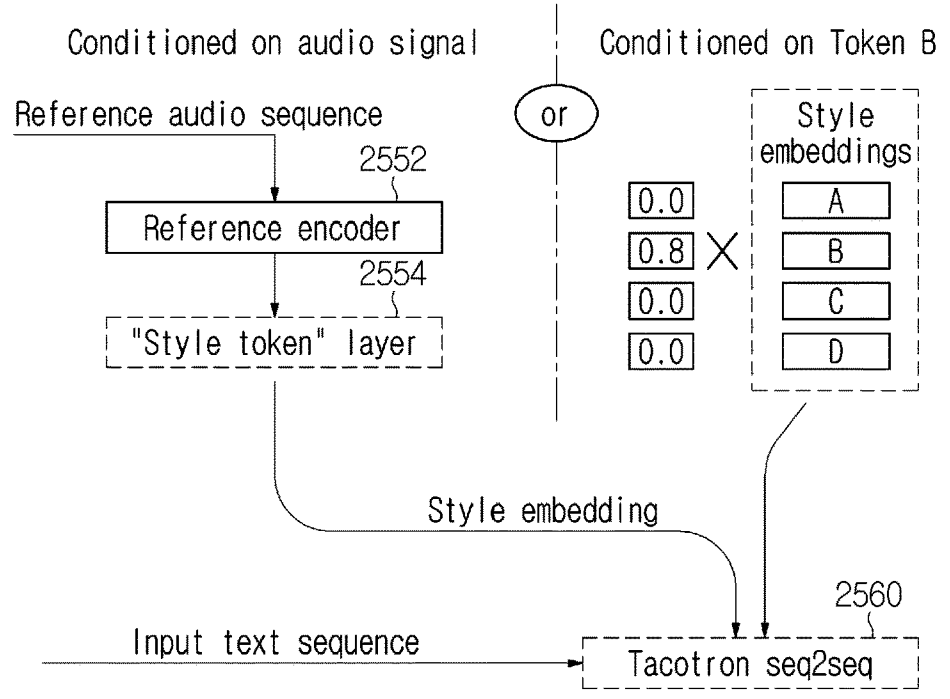

FIGS. 25*a* and 25*b* show an outline of artificial intelligence-based voice synthesis technology applicable to the present disclosure. FIG. 25*a* illustrates a structure for learning or training, and FIG. 25*b* illustrates a structure for inference.

Referring to FIG. 25*a*, a learning system includes a reference encoder 2512, a style token layer 2514, and a Tacotron sequence-to-sequence (seq2seq) model 2520.

The reference encoder 2512 generates reference embedding based on audio sequence input. Specifically, the reference encoder 2512 generates reference embedding by compressing the prosody of the audio sequence input into a fixed-length vector. Reference embedding may be used as ground-truth audio. Reference embedding is forwarded to an attention module 2514*a* in the style token layer 2514, and may be used as a query vector to the attention module 2514*a*. For example, the reference encoder 2512 may consist of a convolutional stack followed by an RNN.

The style token layer 2514 includes the attention module 2514*a*. The attention module 2514*a* learns reference embedding and similarity measurement between tokens. The attention module 2514*a* generates a set of combination weights (e.g., 0.2, 0.1, 0.3, 0.4) indicating a level of contribution for encoded reference embedding of each style token (e.g., A, B, C, D) in a bank of trainable embeddings. The style token may be referred to as global style token or token embedding. A weighted sum of global style tokens is referred to as style embedding and is provided by the Tacotron sequence-to-sequence model. Style embedding represents the prosody and style information of the audio sequence input.

The Tacotron sequence-to-sequence model 2520 converts an input text sequence into voice data based on style embedding. The Tacotron sequence-to-sequence model 2520 includes an encoder states module 2522, an attention module 2524, and a decoder 2526.

The encoder states module 2522 generates a query vector for the attention module 2524 based on the style embedding and text sequence input. Here, the text sequence input includes the same text as the transcript of the audio sequence input to the reference encoder 2512. The encoder states module 2522 generates text embeddings by embedding the text sequence character by character. In addition, the encoder states module 2522 creates concatenation between text embeddings and style embedding. The encoder states module 2522 may include a CBHG (convolutional 1-D filters, bank, highway networks, gated recurrent unit bidirectional) neural network.

The attention module 2524 generates information specifying whether high weight shall be given to text embedding at every decoder timestep in the operation of the decoder 2526. The decoder 2526 generates a mel-spectrogram. The decoder 2526 generates a spectrogram of a next time step by inputting the spectrogram of a specific time step. The decoder 2526 determines which character the voice corresponding to will be synthesized at every decoder time step through alignment with the encoder states. To this end, the decoder 2526 uses information generated by the attention module 2524. The decoder 2526 may include multiple RNNs.

Referring to FIG. 25*b*, the inference system includes a reference encoder 2552, a style token layer 2554, and a Tacotron sequence-to-sequence model 2560. The reference encoder 2552 and the style token layer 2554 perform the same functions as the reference encoder 2512 and the attention module 2514*a* described with reference to FIG. 25*a*. That is, the reference encoder 2552 and the style token layer 2554 provide style embedding necessary for inference. In place of the reference encoder 2552 and the style token layer 2554, pre-generated style embedding may be used. The Tacotron sequence-to-sequence model 2560 converts an input text sequence into voice data based on style embedding. At this time, the style embedding provided to the Tacotron sequence-to-sequence model 2560 may be generated in real time by the reference encoder 2552 and the style token layer 2554, or may be stored in advance.

The voice synthesis technology described with reference to FIGS. 25*a* and 25*b* may be applied to a wireless communication system according to various embodiments described later. However, the voice synthesis technology of FIGS. 25*a* and 25*b* is an example, and may be applied to voice communication according to various embodiments described later with a partially modified structure.

Figure 26:
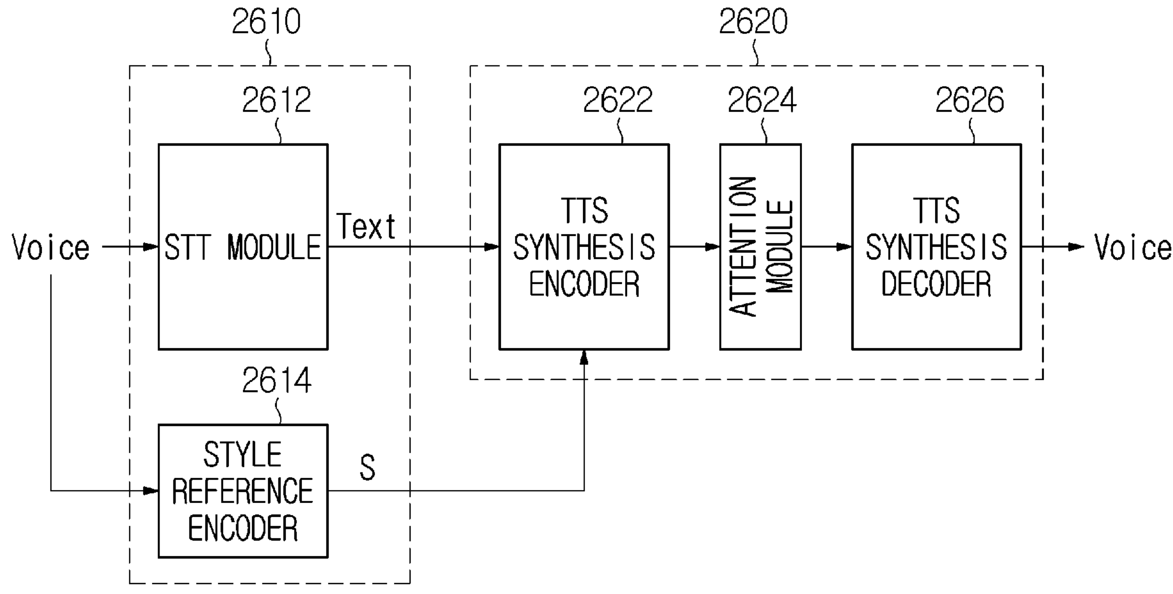
FIG. 26 illustrates the concept of voice communication involving assistance data transmission in a wireless communication system according to an embodiment of the present disclosure.

FIG. 26 illustrates the concept of voice communication involving assistance data transmission in a wireless communication system according to an embodiment of the present disclosure. FIG. 26 illustrates the functional structure of a transmission apparatus 2610 and a reception apparatus 2620 that perform voice communication.

Referring to FIG. 26, the transmission apparatus 2610 includes a speech to text (STT) module 2612 and a style reference encoder 2614, and the reception apparatus 2620 includes a text to speech (TTS) synthesis encoder 2622, an attention module 2624, and a TTS synthesis decoder 2626.

The STT module 2612 converts the input voice signal into text (textg). The converted text is transmitted to the reception apparatus 2620. The style reference encoder 2614 generates a style embedding vector S according to the channel situation between the transmission apparatus 2610 and the reception apparatus 2620 and transmits it to the reception apparatus 2620. Here, for the style embedding vector S, if the channel quality is excellent, a high bitrate may be applied, and if the channel quality is poor, a low bitrate may be applied. That is, the style embedding vector S is transmitted according to a variable bitrate (VBR) based on channel quality.

The TTS synthesis encoder 2622 generates text embeddings based on the text and style embedding vector S provided from the transmission apparatus 2610. The attention module 2624 generates attention information indicating the weights given to each text embedding at each time step during the voice synthesis operation of the TTS synthesis decoder 2626. The TTS synthesis decoder 2626 generates a voice signal based on text embeddings and attention information.

Figure 27:
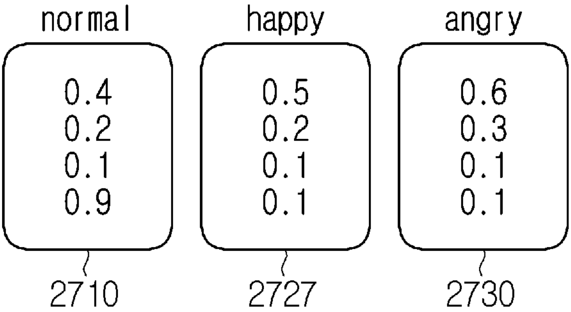
FIG. 27 shows examples of assistance data for voice communication in a wireless communication system according to an embodiment of the present disclosure.

The style embedding vector S sent from the transmission apparatus 2610 to the reception apparatus 2620 is a set of values representing acoustic characteristics related to the prosody of the voice signal. The style embedding vector S allows acoustic characteristics to be added during voice synthesis, and may be referred to as 'assistance information', 'assistance data', 'acoustic feature data', 'acoustic embedding data', 'style data', and 'voice description data. The style embedding vector S may be defined in the form shown in FIG. 27 below. FIG. 27 shows examples of assistance data for voice communication in a wireless communication system according to an embodiment of the present disclosure. FIG. 27 illustrates style embedding vectors according to emotional state. Referring to FIG. 27, the style embedding vector 2710 representing a normal emotional state, the style embedding vector 2720 representing a happy emotional state, and the style embedding vector 2730 representing an angry emotional state may be defined by different values.

Based on the same structure as in FIG. 26, when transmitting the voice "Just love me like you do now. You are the only one who will have everything of me if you don't change. I won't be shaken", the text is "Just love me like you do now. You are the only one who will have everything of me if you don't change. I won't be shaken", which requires 96 bytes/19 sec=40.42 bps. In addition, the style embedding vector S requires 4×32 bit/19 sec=6.73 bps, assuming one transmission per sentence. According to one embodiment, the style embedding vector S may be transmitted once per sentence if the channel quality is excellent, and once per four sentences if the channel quality is poor. In this case, the required bitrate according to channel quality is shown in Table 3 below.

TABLE k3

| Channel quality | VBR |
|---|---|
| Excellent | 4 × 32 bit/19 sec = 6.73 bps |
| poor | 4 × 32 bit/(19 × 4)sec = 1.68 bps |

As described with reference to FIG. 26, the voice signal is expressed as a combination of text data and assistance data (e.g., style embedding vector), and text data and assistance data may be transmitted in place of the voice data that directly expresses the voice signal. At this time, the bitrate applied to the assistance data is adjusted according to the channel quality. However, if the channel quality is so poor that even the lowest allowable bitrate is not acceptable, only text data may be transmitted without assistance data. A structure in which only text data is transmitted is illustrated in FIG. 28.

Figure 28:
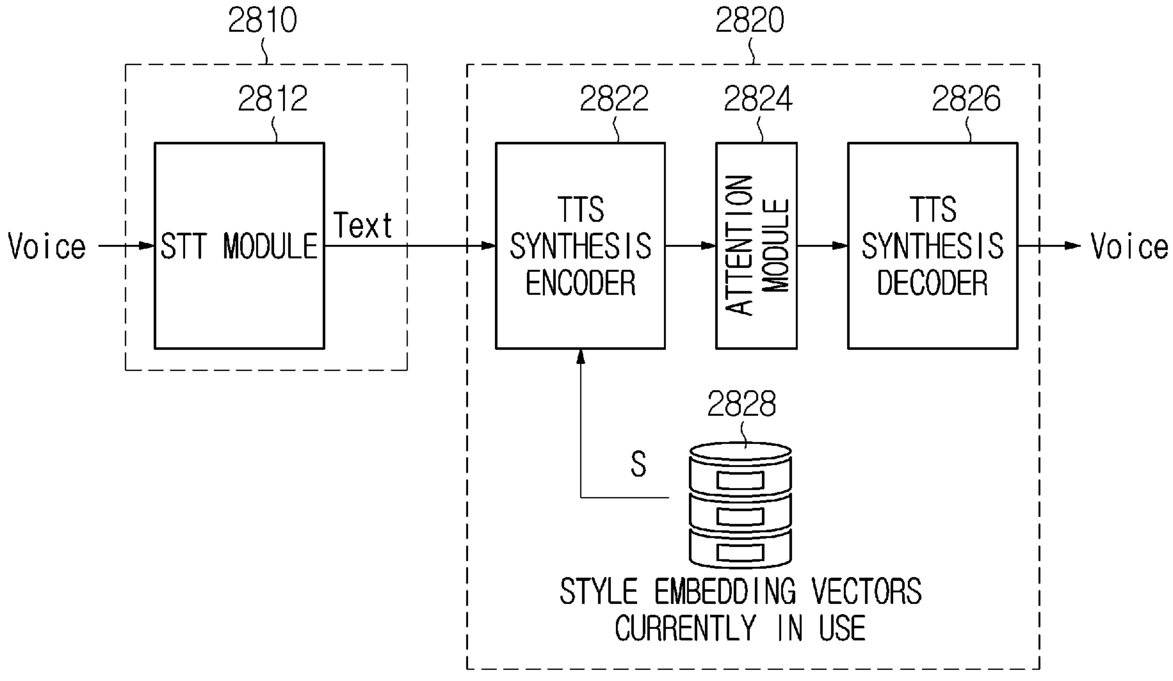
FIG. 28 illustrates the concept of voice communication without assistance data transmission in a wireless communication system according to an embodiment of the present disclosure.

FIG. 28 illustrates the concept of voice communication without assistance data transmission in a wireless communication system according to an embodiment of the present disclosure. FIG. 28 illustrates the functional structure of a transmission device 2810 and a reception device 2820 that perform voice communication.

Referring to FIG. 28, the transmission device 2810 includes an STT module 2812, and the reception device 2820 includes a TTS synthesis encoder 2822, an attention module 2824, and a TS synthesis decoder 2826.

The STT module 2812 converts an input voice signal into text. The converted text is transmitted to the reception device 2820. The TTS synthesis encoder 2822 generates text embeddings based on the text and style embedding vector S. At this time, the style embedding vector S previously used by the reception device 2820 may be used again. That is, since the style embedding vector S is not provided from the transmission device 2810, the reception device 2820 reuses the style embedding vector S used in the past. The attention module 2824 generates attention information indicating the weights assigned to each text embedding at each time step during the speech synthesis operation of the US synthesis decoder 2826. The US synthesis decoder 2826 generates a voice signal based on text embeddings and attention information.

Based on the same structure as in FIG. 28, when transmitting the voice "Just love me like you do now. You are the only one who will have everything of me if you don't change. I won't be shaken", the text is "Just love me like you do now. You are the only one who will have everything of me if you don't change. I won't be shaken", which requires 96 bytes/19 sec=40.42 bps. Since the style embedding vector S is not transmitted, no additional resources other than those for transmitting text are required.

The two structures described with reference to FIGS. 26 and 28 may be understood as being adaptively selected according to channel quality. That is, devices according to various embodiments are designed to support both the structures of FIGS. 26 and 28, and may operate as shown in FIG. 26 or as shown in FIG. 28 depending on channel quality.

Figure 29:
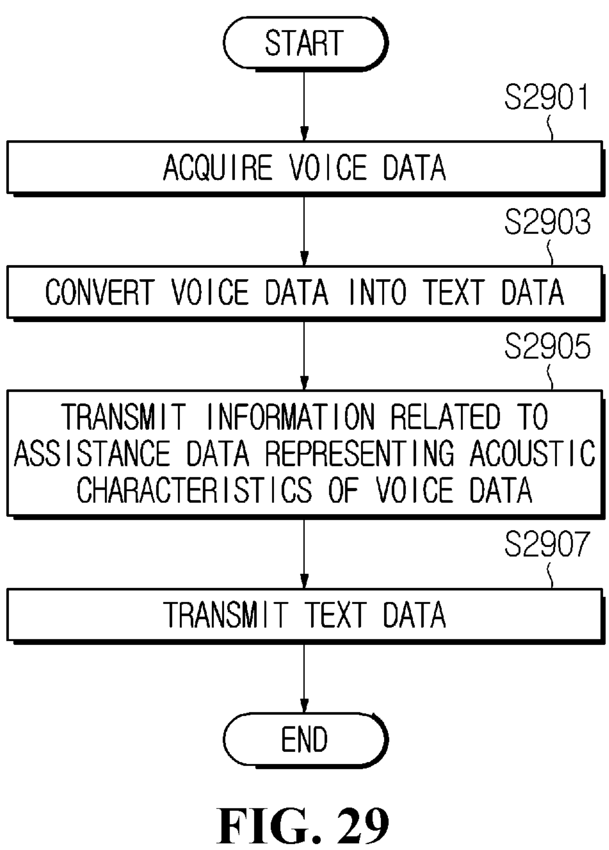
FIG. 29 illustrates an example of a procedure for transmitting voice data in a wireless communication system according to an embodiment of the present disclosure.

FIG. 29 illustrates an example of a procedure for transmitting voice data in a wireless communication system according to an embodiment of the present disclosure. FIG. 29 illustrates a method of operating an device (e.g., the transmission device 2610 of FIG. 26 and the transmission device 2810 of FIG. 28).

Referring to FIG. 29, in step S2901, the device acquires voice data. For example, the device may quantize a voice signal input through a microphone. Alternatively, the device may receive voice data from outside through a communication line. According to one embodiment, voice data may include data representing the speaker's voice to be transmitted to the other device through a voice call.

In step S2903, the device converts voice data into text data. The device may generate text data corresponding to voice data based on STT technology. For example, the device may remove noise from the voice data, extract feature information, and then generate text data based on the extracted feature information. To this end, the device may use at least one artificial intelligence model. For example, the at least one artificial intelligence model may include at least one of an artificial intelligence model that determines the characteristics of sounds and converts them into characters, or an artificial intelligence model that corrects characters based on context, grammar, spelling, etc.

In step S2905, the device transmits information related to assistance data representing acoustic characteristics of voice data. The assistance data is information representing at least one of pitch, stress, or speed of voice data, and may include a style embedding vector. Information related to assistance data may include at least one of assistance data, information indicating whether assistance data is provided, or information indicating a transmission period of assistance data. Items included in information related to assistance data may be determined based on channel quality. When transmitting assistance data, the device may generate the assistance data based on the acquired voice data.

In step S2907, the device transmits text data. The device may transmit text data through a channel established for communication with the other device. According to one embodiment, the device may compress text data to reduce the amount of data.

Figure 30:
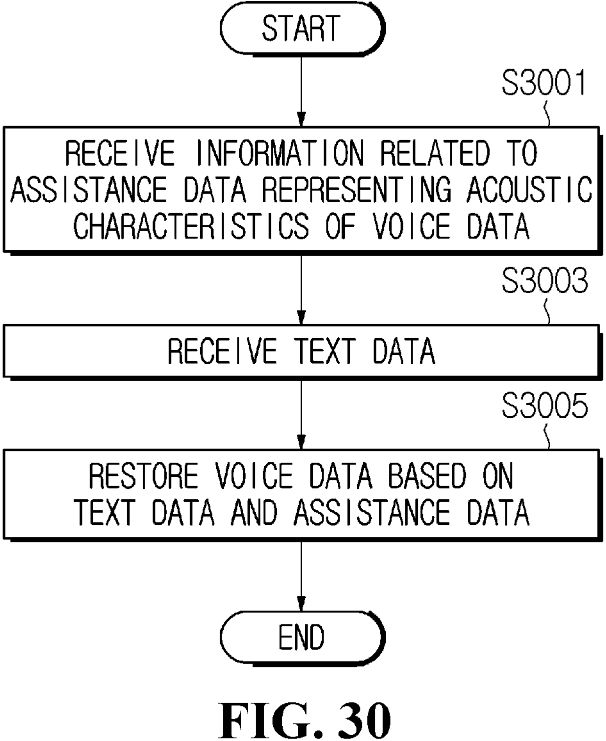
FIG. 30 illustrates an example of a procedure for receiving voice data in a wireless communication system according to an embodiment of the present disclosure.

FIG. 30 illustrates an example of a procedure for receiving voice data in a wireless communication system according to an embodiment of the present disclosure. FIG. 30 illustrates a method of operating a device (e.g., the reception device 2620 of FIG. 26 and the reception device 2810 of FIG. 28).

Referring to FIG. 30, in step S3001, the device receives information related to assistance data representing acoustic characteristics of voice data. The assistance data is information representing at least one of pitch, stress, or speed of voice data, and may include a style embedding vector. Information related to assistance data may include at least one of assistance data, information indicating whether assistance data is provided, and information indicating a transmission cycle of assistance data. Items included in information related to assistance data may be determined based on channel quality.

In step S3003, the device receives text data. The text data corresponds to the voice data to be restored and may be generated by the other device. The device may receive text data through a channel established for communication with the other device. According to one embodiment, the text data may be received in a compressed state. In this case, the device may decompress the compressed text data.

In step S3005, the device restores voice data based on the text data and assistance data. For example, the device may generate text embeddings based on the text data and assistance data, generate attention information indicating the weights given to each text embedding at each time step during speech synthesis operation, and generate a voice signal based on the text embeddings and attention information. At this time, if assistance data is not provided from the other device, the device may use the assistance data used during previous communication with the other device or use designated default assistance data.

As described with reference to FIGS. 29 and 30, voice data may be restored based on text data and assistance data generated from voice data. At this time, restoration of voice data is performed based on an artificial intelligence model, and it is desirable to use a learned network model to restore voice data with sufficient reliability. Since learning of the network model may be performed using the voice data of the speaker, learning is easily performed by the device that transmits voice data. Accordingly, before transmitting text data, etc., the device may provide information related to the learned network model (e.g., neural network structure, weight values, etc.) to the other device.

As described with reference to FIGS. 29 and 30, voice communication may be performed by transmitting and receiving text data and assistance data generated from voice data rather than the voice data itself. At this time, the assistance data may or may not be transmitted based on channel quality, and the frequency at which the assistance data is transmitted may be adjusted. To this end, an operation to measure channel quality may be preceded. The procedure including the operation of measuring channel quality will be described below with reference to FIG. 31.

Figure 31:
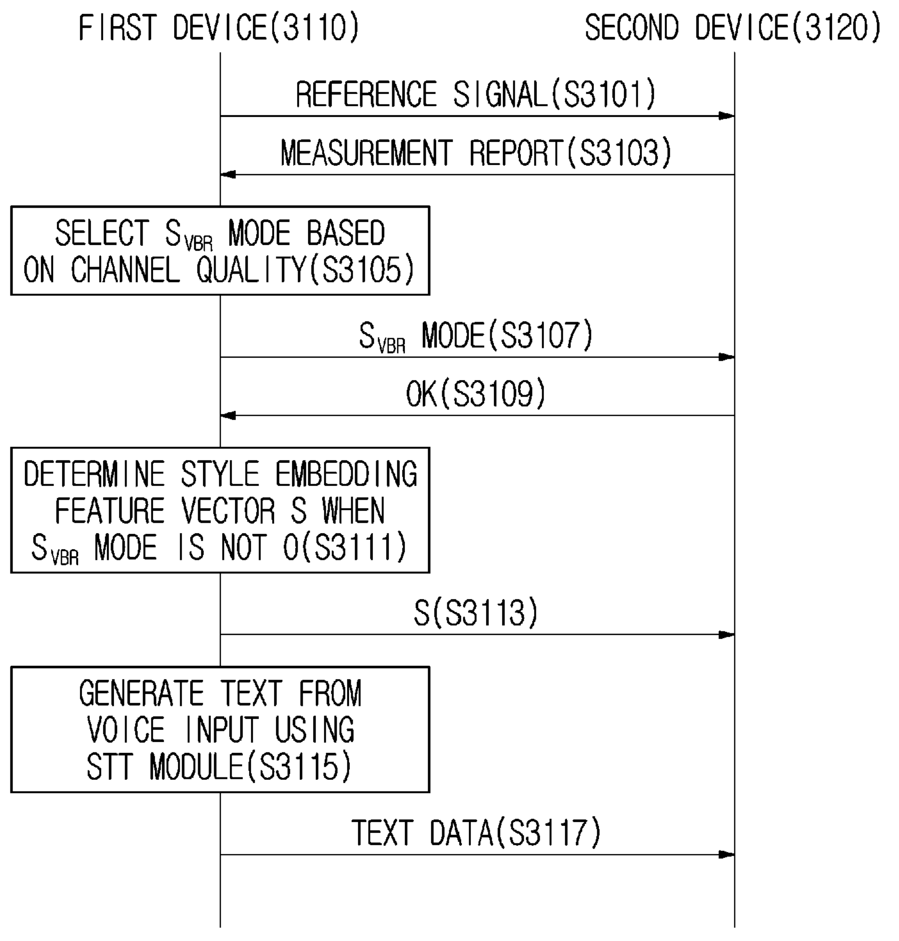
FIG. 31 illustrates an example of a procedure for voice communication in a wireless communication system according to an embodiment of the present disclosure.

FIG. 31 illustrates an example of a procedure for voice communication in a wireless communication system according to an embodiment of the present disclosure. FIG. 31 illustrates signal exchange for voice communication between a first device 3110 that generates voice data and a second device 3120 that restores voice data.

Referring to FIG. 31, in step S3101, the first device 3110 transmits a reference signal to the second device 3120. The second device 3120, which has received the reference signal, may measure channel quality. For example, the reference signal may include a reference signal related to channel state information (CSI). In step S3103, the second device 3120 transmits a measurement report to the first device 3110. In other words, the second device 3120 feeds back the channel quality. For example, the second device 3120 may transmit a CSI report. According to another embodiment, when channel reciprocity is secured, instead of steps S3101 and S3103, the second device 3120 may transmit the reference signal to the first device 3110, and the first device 3110 may measure channel quality.

In step S3105, the first device 3110 selects an $S_{VBR}$ mode based on channel quality. To this end, a plurality of sections for the value of the channel quality are defined, and if the channel quality is in the lowest section, the $S_{VBR}$ mode is determined to be mode 0, in which assistance data, that is, a style embedding vector, is not transmitted. In step S3107, the first device 3110 transmits a message indicating the $S_{VBR}$ mode to the second device 3120. In step S3109, the second device 3120 transmits an OK message indicating that the second device 3120 identifies the $S_{VBR}$ mode to the first device 3110. The OK message may include an ACK (acknowledge) message or a response message.

In step S3111, if the $S_{VBR}$ mode is not 0, the first device 3110 determines the style embedding vector S. In step S3113, the first device 3110 transmits the style embedding vector S to the second device 3120. If the $S_{VBR}$ mode is 0, steps S3111 and S3113 are omitted.

In step S3115, the first device 3110 generates text from voice input using the STT module. In step S3117, the first device 3110 transmits text data to the second device 3120. Accordingly, the second device 3120 may restore voice data using the text data and style embedding vector.

In the procedure described with reference to FIG. 31, each of the first device 3110 and the second device 3120 may be a base station or a terminal. For example, the first device 3110 and the second device 3120 may be two terminals that perform voice communication based on a sidelink. As another example, the first device 3110 and the second device 3120 may be a base station and a terminal or a terminal and a base station.

When the first device 3110 and the second device 3120 are a base station and a terminal, the procedure illustrated in FIG. 31 may be understood as a procedure in which voice is transmitted through the downlink. Then, the other terminal of voice communication and the other terminal's serving base station perform a procedure similar to that in FIG. 31. That is, the other terminal may determine the $S_{VBR}$ mode based on uplink channel quality and transmit at least one of a style embedding vector or text data to the base station according to the determined $S_{VB}$R mode.

According to another embodiment, the serving base station(s) of two terminals performing voice communication may transmit text data and a style embedding vector without restoration. In other words, the operation of generating text data and a style embedding vector from voice data and the operation of restoring voice data from text data and a style embedding vector are performed only by the terminal, and the base station(s) may receive the text data and style embedding vector from a transmission terminal and transmit them to a reception terminal. At this time, since the two terminals performing voice communication may experience different channels, the $S_{VBR}$ modes of the two terminals may be different. Alternatively, the $S_{VBR}$ mode may be equally determined depending on the relatively poor channel quality of the two terminals.

Figure 32:
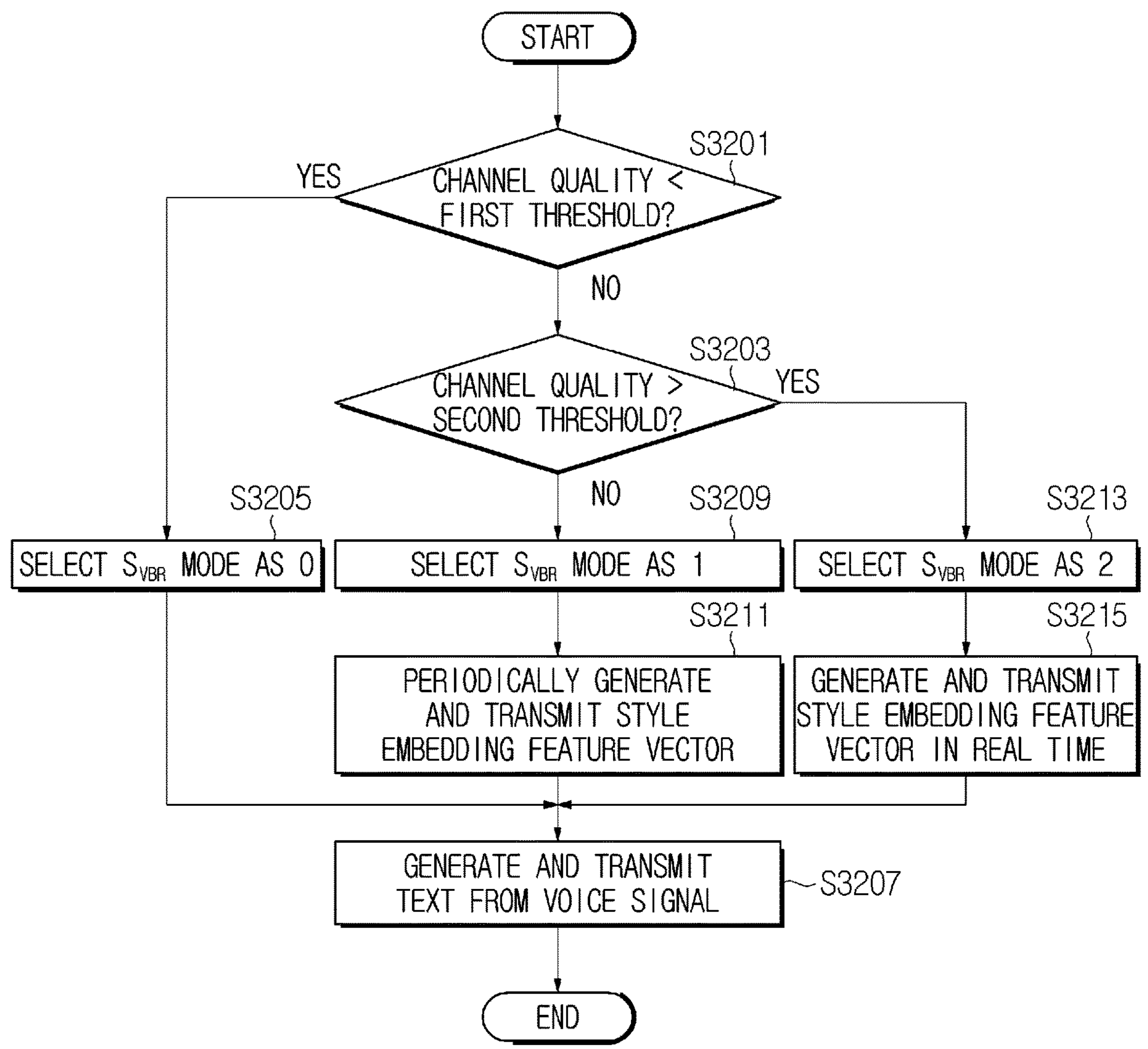
FIG. 32 illustrates another example of a procedure for transmitting voice data in a wireless communication system according to an embodiment of the present disclosure.

FIG. 32 illustrates another example of a procedure for transmitting voice data in a wireless communication system according to an embodiment of the present disclosure. FIG. 32 illustrates a method of operating a device (e.g., the transmission device 2610 in FIG. 26 and the transmission device 8110 in FIG. 28).

Referring to FIG. 32, in step S3201, the device compares the channel quality and a first threshold. The first threshold is a reference channel quality value for selecting mode 0, the lowest mode among $S_{VBR}$ modes. If the channel quality is greater than or equal to the first threshold, in step S3203, the device compares the channel quality and a second threshold. The second threshold is a reference channel quality value for selecting mode 2, the highest mode among $S_{VBR}$ modes. By steps S3201 and S3203, it is determined which of three sections (e.g., a first section where the channel quality is less than the first threshold, a second section where the channel quality is greater than or equal to the first threshold and less than the second threshold, and a third section where the channel quality is greater than or equal to the second threshold) the channel quality belongs to.

If the channel quality is less than the first threshold, in step S3205, the device selects the $S_{VBR}$ mode as 0. In step S3207, the device generates text from the voice signal and transmits the text. At this time, although not shown in FIG. 32, before transmitting text, the device may transmit, to the other device, a message indicating that the $S_{VBR}$ mode is 0. In other words, the device notifies the other device that the style embedding feature vector is not transmitted and instructs the other device to use the existing style embedding feature vector.

If the channel quality is greater than or equal to the first threshold and less than the second threshold, in step S3209, the device selects the $S_{VBR}$ mode as 1. Next, in step S3211, the device periodically generates a style embedding feature vector and transmits the generated style embedding feature vector. For example, one style embedding feature vector may be generated and transmitted every multiple sentences. Then, in step S3207, the device generates text from the voice signal and transmits the text. At this time, although not shown in FIG. 32, before transmitting text, the device may transmit, to the other device, a message indicating that $S_{VBR}$ mode is 1.

If the channel quality is greater than or equal to the second threshold, in step S3213, the device selects $S_{VBR}$ mode as 2. In step S3215, the device generates a style embedding feature vector in real time and transmits the generated style embedding feature vector. For example, one style embedding feature vector may be generated and transmitted every sentence. Then, in step S3207, the device generates text from the voice signal and transmits the text. At this time, although not shown in FIG. 32, before transmitting text, the device may transmit, to the other device, a message indicating that $S_{VBR}$ mode is 2.

Figure 33:
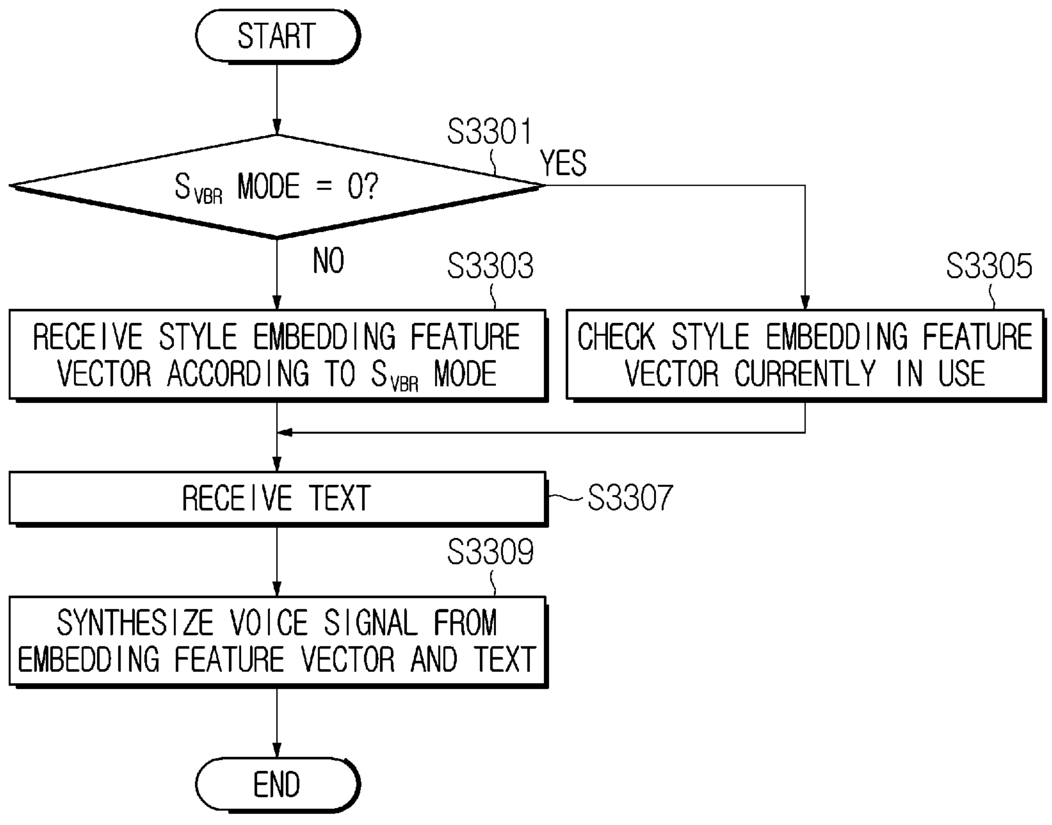
FIG. 33 illustrates another example of a procedure for receiving voice data in a wireless communication system according to an embodiment of the present disclosure.

FIG. 33 illustrates another example of a procedure for receiving voice data in a wireless communication system according to an embodiment of the present disclosure. FIG. 33 illustrates a method of operating a device (e.g., the reception device 2620 in FIG. 26 and the reception device 2810 in FIG. 28).

Referring to FIG. 33, in step S3301, the device checks whether $S_{VBR}$ mode is 0. For example, the device may check the $S_{VBR}$ mode indicated by a message received from the other device and check whether the checked $S_{VBR}$ mode is 0.

If the $S_{VBR}$ mode is not 0, in step S3303, the device receives the style embedding feature vector according to the $S_{VBR}$ mode. Depending on the $S_{VBR}$ mode, the period at which the style embedding feature vector is received may vary. For example, the period may be every sentence or multiple sentences.

On the other hand, if the $S_{VBR}$ mode is 0, in step S3305, the device checks the style embedding feature vector currently in use. If the $S_{VBR}$ mode is 0, the style embedding feature vector is not provided, so the device checks the style embedding feature vector used during past voice communication with the other device.

In step S3307, the device receives text. The text data corresponds to the voice data to be restored and may be generated by the other device. The device may receive text data through a channel established for communication with the other device.

In step S3309, the device synthesizes voice data from the embedding feature vector and text. For example, the device may generate text embeddings based on text data and assistance data, generate attention information indicating the weights given to each text embedding at each time step during voice synthesis operation, and generate a voice signal based on the text embeddings and attention information. At this time, if the style embedding feature vector is not provided from the other device, that is, if the $S_{VBR}$ mode is 0, the device may use the style embedding feature vector used during previous communication with the other device or designated default style embedding feature vector.

According to various embodiments as described above, during voice communication, voice data is converted into text data and assistance data, text data with most of informativity is completely sent at a fixed bit rate, and assistance data representing acoustic characteristics is transmitted at a variable bitrate depending on channel quality. Accordingly, voice communication can be effectively performed while maintaining informativity of voice data.

This communication method may be referred to as style communication. As described above, style communication based on separation of style information such as assistance data is not limited to voice transmission and may be expanded and applied to high-capacity services such as 3D video, remote driving video transmission, and holograms.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

INDUSTRIAL AVAILABILITY

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

What is claimed is:

1. A method of operating a terminal in a wireless communication system, the method comprising:

camping on a first base station belonging to a first network;

receiving a first message including information related to fallback for a call service from the first base station;

transmitting a second message requesting the fallback for the call service to the first base station based on channel quality of the first base station being less than a threshold determined based on the information; and transmitting a third message to a second base station belonging to a second network, wherein the information related the fallback comprises information related to a range of the threshold for determining whether to perform the fallback for the call service.

2. The method of claim 1, further comprising:

receiving configuration information related to recording of measurement values of channel quality from the first base station.

3. The method of claim 1, further comprising:

recording measurement values of channel quality of the first base station.

4. The method of claim 3, further comprising:

determining the threshold based on the measurement values and the range.

5. The method of claim 4, wherein the determining the threshold comprises, determining the threshold using a Bayesian optimization (BO) technique using an observation including a paging success probability per threshold used in the past and an object function set based on the measurement values and the range.

6. The method of claim 5, wherein a Gaussian process is used as a surrogate function for the BO technique, and wherein an expected improvement (EI) is used as an acquisition function for the BO technique.

7. The method of claim 1, further comprising:

transmitting a fourth message to the first base station without the fallback, in case that the channel quality of the first base station is greater than or equal to the threshold.

8. The method of claim 7, further comprising:

recording whether paging of the threshold is successful based on whether to maintain the call service in the first network.

9. The method of claim 7, wherein the call service provided by the first network comprises a call service in which text data generated from voice data and assistance data representing acoustic characteristics of the voice data are transmitted and received.

10. The method of claim 9, wherein the assistance data is transmitted based on a bitrate determined according to channel quality between the first base station and the terminal, and wherein the text data is transmitted based on a fixed bitrate.

11. The method of claim 9, wherein the assistance data includes a style embedding vector representing at least one of a pitch, stress or speed of the voice data.

12. The method of claim 9, further comprising:

receiving, from the first base station, information related to a network model for inferring voice data based on the text data and the assistance data.

13. A method of operating a base station in a wireless communication system, the method comprising:

receiving a first message indicating that a terminated call has occurred from an upper node to a terminal;

transmitting, to the terminal, a second message including information indicating a range of a threshold for determining whether to perform fallback of a call service; and receiving, from the terminal, a third message requesting the fallback or a paging response message corresponding to the second message.

14. A terminal in a wireless communication system, the terminal comprising:

a transceiver; and a processor connected to the transceiver, wherein the processor is configured to:

camp on a first base station belonging to a first network;

receive a first message including information related to fallback for a call service from the first base station belonging to the first network;

transmit a second message requesting the fallback for the call service to the first base station based on channel quality of the first base station being less than a threshold determined based on the information; and transmit a third response message to a second base station belonging to a second network, wherein the information related the fallback comprises information related to a range of the threshold for determining whether to perform the fallback for the call service.

* * * * *